(12) United States Patent
Al Amri

(10) Patent No.: US 7,014,120 B2
(45) Date of Patent: Mar. 21, 2006

(54) SMART DOCUMENTS

(76) Inventor: Moosa Eisa Al Amri, Al Reem Tower, Maktoum Street - P.O. Box 14427, Dubai (AE)

( * ) Notice: Subject to any disclaimer, the term of this patent is extended or adjusted under 35 U.S.C. 154(b) by 63 days.

(21) Appl. No.: 10/807,637

(22) Filed: Mar. 24, 2004

(65) Prior Publication Data

US 2004/0173686 A1    Sep. 9, 2004

Related U.S. Application Data

(63) Continuation of application No. PCT/IB02/04077, filed on Oct. 2, 2002.

(30) Foreign Application Priority Data

| Oct. 2, 2001 | (AE) | 279/2001 |
| Jul. 16, 2002 | (WO) | PCT/IB02/02830 |

(51) Int. Cl.
   *G06K 19/00* (2006.01)

(52) U.S. Cl. ............ 235/487; 235/380; 235/379; 235/382; 235/383; 235/375; 283/61; 283/62; 283/82; 283/83

(58) Field of Classification Search ........... 235/487, 235/380, 379, 382, 383, 375; 283/61, 62, 283/82, 83
   See application file for complete search history.

(56) References Cited

U.S. PATENT DOCUMENTS

| 3,912,082 | A | * | 10/1975 | Gerner et al. | 206/531 |
| 5,044,668 | A | | 9/1991 | Wright | |
| 5,612,527 | A | * | 3/1997 | Ovadia | 235/383 |
| 5,686,713 | A | * | 11/1997 | Rivera | 235/380 |
| 5,834,747 | A | | 11/1998 | Cooper | |
| 6,097,292 | A | | 8/2000 | Kelly | |
| 6,513,710 | B1 | * | 2/2003 | Haas | 235/380 |
| 6,588,658 | B1 | * | 7/2003 | Blank | 235/380 |
| 6,764,014 | B1 | * | 7/2004 | Lasch et al. | 235/487 |
| 6,769,718 | B1 | * | 8/2004 | Warther et al. | 283/61 |
| 2003/0150550 | A1 | * | 8/2003 | Weirather et al. | 156/248 |
| 2003/0150919 | A1 | * | 8/2003 | Blank | 235/487 |
| 2004/0089706 | A1 | * | 5/2004 | Hill et al. | 235/375 |

FOREIGN PATENT DOCUMENTS

| DE | 196 08 757 | 9/1997 |
| DE | 197 22 627 | 10/1998 |
| GB | 2351379 | 12/2000 |

(Continued)

*Primary Examiner*—Jared J. Fureman
*Assistant Examiner*—Allyson N Trail
(74) *Attorney, Agent, or Firm*—Strum & Fix LLP

(57) ABSTRACT

The invention relates to Smart Documents to be used in various administrative, financial and other applications, in particular bank cheques and other paper value documents that require authentication, boarding passes for transport systems, documents for access functions and multipurpose uses, in particular Smart Documents that comprise a pliable thin portion (10) carrying on its front and/or rear face imprinted visible data, and a thick portion (5) wherein a magnetic strip (62) and/or storage chip (5a) of the contact and/or contactless type is/are merged. The document's thick portion (5), i.e. wherein the magnetic strip and/or storage chip is merged, is a planar card (58) attached to an edge (15) of the document's thin portion (10) in a manner allowing inclination of the card (58) relative to the thin portion. This makes it very easy to pass the combined document through reading/writing devices, while the thickness of the card portion (58) allows incorporation of magnetic strips (62) and/or storage chips (59) of high storage capacity.

35 Claims, 41 Drawing Sheets

FOREIGN PATENT DOCUMENTS

| | | |
|---|---|---|
| WO | WO9203804 | 3/1992 |
| WO | WO9916015 | 4/1999 |
| WO | WO0048122 | 8/2000 |
| WO | WO0057344 | 9/2000 |
| WO | WO0141082 | 6/2001 |
| WO | WO0143066 | 6/2001 |

* cited by examiner

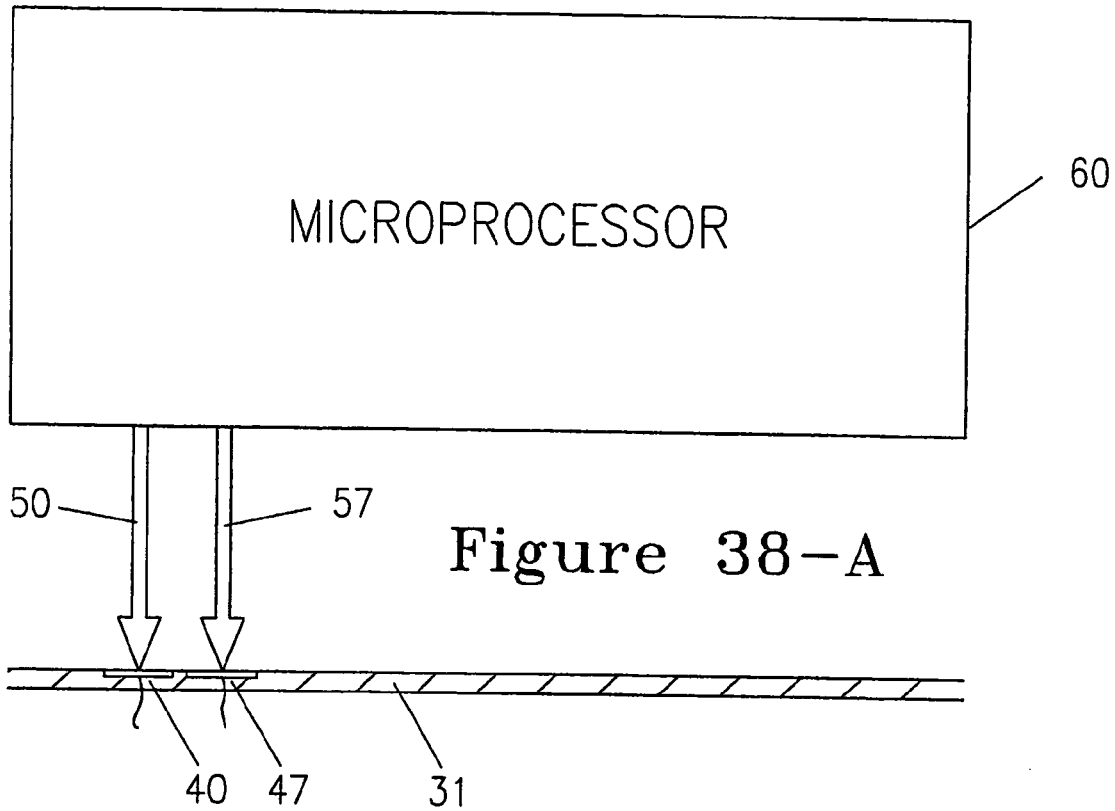
Figure 38-A
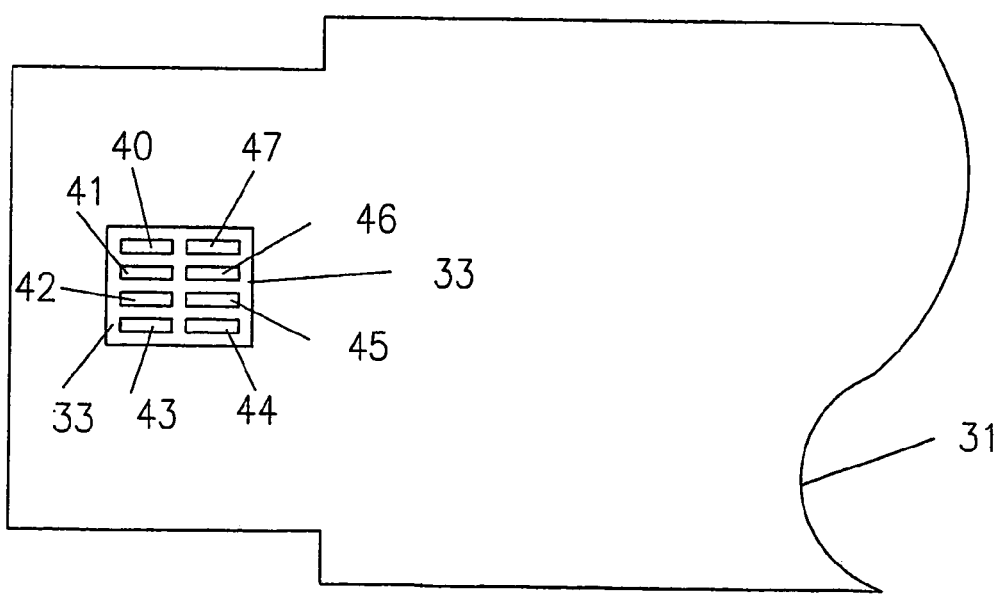
Figure 38-B

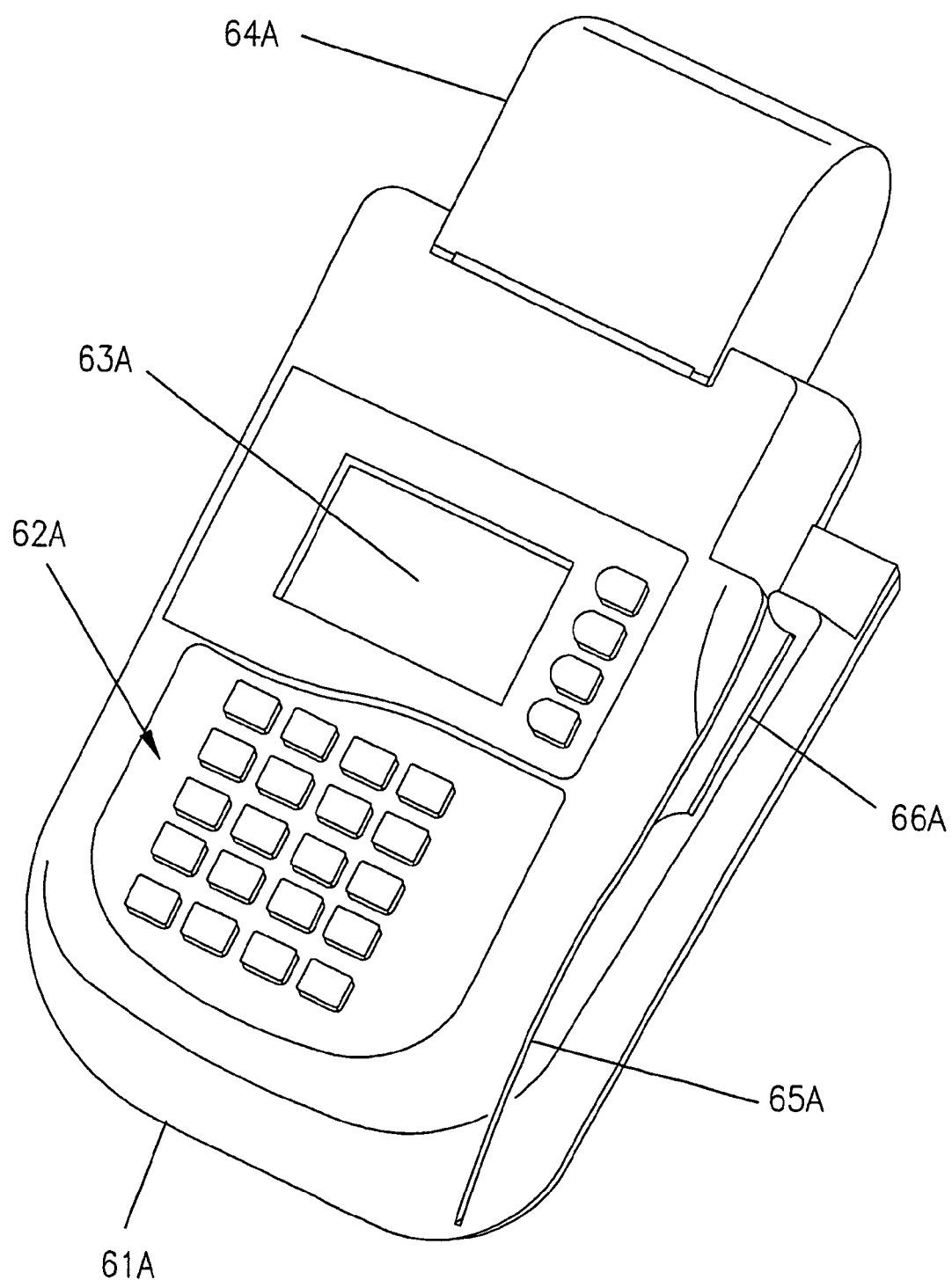
Figure 38-C

SMART DOCUMENTS

CROSS REFERENCE TO RELATED APPLICATIONS

This application is a Continuation application of PCT/IB02/04077 filed Oct. 2, 2002, claiming priority of UAE No. 279/2001 filed Oct. 2, 2001 and PCT/IB02/02830 filed Jul. 16, 2002, which are included in their entirety by reference made hereto.

FIELD OF THE INVENTION

The invention relates to Smart Documents to be used in various administrative, financial and other applications, in particular bank cheques and other paper value documents that require authentication, boarding passes for transport systems, documents for access functions, and multipurpose uses. A Smart Document is one which carries imprinted visible data and which also includes a magnetic strip and/or storage chip storing encoded data that is readable by means of a reader. The invention concerns in particular Smart Documents that comprise a pliable thin portion carrying on its front and/or rear face imprinted visible data, and a thick portion wherein a magnetic strip and/or storage chip is/are merged.

BACKGROUND OF THE INVENTION

A—Old Techniques Using Magnetic Strips and/or Magnetized Strips

Using magnetic strips and/or magnetized strips is a well-known technique in many fields of application including using magnetic strips in metro tickets which are used to enter and exit from metro stations.

Magnetic strips programmed by special programming systems equip in this case metro tickets and, through reading devices at the gate, it is possible to deal with the tickets according to the information registered in the magnetic strip e.g. the number of stations. The ticket holder can pass as per the pre-programmed particulars at the gates using reading devices stationed at the gates. The same applies to monthly, quarterly or annual subscriptions.

As mentioned, magnetic strips and/or magnetized strips can be numerically programmed according to the number of the stations in the daily tickets, which are used only once. Programming such strips achieves the aimed-for purpose. These strips are processed through programming and reading systems for the purpose of achieving financial and economic security and saving time and effort, also criminal security by not allowing those who do not hold tickets or subscriptions to enter or exit from the stations.

Magnetic or magnetized strips have other applications for instance for access to hotel rooms where the magnetic strips are used as a key and the locks are used as a reader for the strips. If the particulars on a strip are identical with those stored in the lock, the door opens.

Magnetic strips and/or magnetized strips are also used in the field of air tickets.

B—Old Techniques in the Field of Smart Cards

Smart Cards are used in everyday life in telephone cards and many other applications some of which are summarized below.

Smart Cards:

Smart cards are similar to credit cards, with a computer storage chip capable to store and transmit information. Processor Cards contain a memory and processor, which is capable to transmit/restore information that makes this sort of card a unique procedure in personal identification. Operating the information also allows dynamic storage management, which makes such cards multi usage.

Smart Card technology has grown tremendously in Europe; as an example telephone cards that came into widespread use due to the high costs of communications that made on-line operation very costly. ID Smart Cards are also used in sales outlets and for securing entry into buildings, computers and banks.

Smart Card technology provides a large storage capacity for storing and searching a variety of information. It also can manage high security operations to search personal identification information i.e. photos, signatures, fingerprints etc.

Storage chips can also be made from plastic instead of silicon, which could revolutionize the communications industry. Production of plastic storage chips would not drive silicon from the market, but would help in establishing a new generation of inexpensive smart storage chips.

Various types of Smart Cards are available:

1—Proximity Cards

Proximity cards or simply "prox cards" communicate through an antenna similar to contactless smart cards except that they are read-only devices that generally have a greater range of operation. The range of operation for prox cards is typically from 2.5" to 20" (63.5 mm to 508 mm) depending on the reader. It is possible to read a small amount of information with prox cards such as an identification code that is usually verified by a remote computer; however, it is not possible to write information back to the card. Prox cards are available from several sources in both ISO thickness cards from 0.027" to 0033" (0.686 mm to 0.838 mm) and "clamshell" cards from 0.060" to over 0.070" thick (1.52 mm to over 1.78 mm).

Prox cards continue to grow in popularity because of the convenience they offer in security, identification, and access control applications, especially door access where fast, hands-free operation is preferred.

Select Card Printer/Encoders can be with an optional e-card docking containing a prox card encoder. Printer/Encoders equipped with this option are used to read information from the memory of prox chips, print on the front and back of the ISO version card (which e.g. complies with HID Prox Card specifications) and encode either an ISO or JISII magnetic stripe, all in a seamless one-pass process.

2—Contact Smart Cards

Contact smart cards are the size of a conventional credit or debit card with a single embedded integrated circuit chip that contains just memory or memory plus a microprocessor. Memory-only chips are functionally similar to a small floppy disk. They are less expensive than microprocessor chips, but they also offer less security so they should not be used to store sensitive or valuable information. Chips that contain both memory and a microprocessor are also similar to a small floppy disk, except they contain an "intelligent" controller used to securely add, delete, change, and update information contained in memory. The more sophisticated microprocessor chips have state-of-the-art security features built in to protect the contents of memory from unauthorized access.

Contact smart cards must be inserted into a card acceptor device where pins attached to the reader make "contact"

with pads on the surface of the card to read and store information in the chip. This type of e-card (that complies e.g. with the ISO 7816 standard Parts 1–4 (T=0,T=1)) is used in a wide variety of applications including network security, vending, meal plans, loyalty, electronic cash, government IDs, campus IDs, e-commerce, health cards, and many more.

3—Contactless Smart Cards

In addition to the features and functions found in contact smart cards, contactless smart cards contain an embedded antenna instead of contact pads attached to the chip for reading and writing information contained in the chip's memory. Contactless cards do not have to be inserted into a card acceptor device. Instead, they need only be passed within range of a radio frequency acceptor to read and store information in the chip. The range of operation is typically from about 2.5" to 3.9" (63.5 mm to 99.06 mm) depending on the acceptor.

Contactless smart cards are used in many of the same applications as contact smart cards, especially where the added convenience and speed of not having to insert the card into a reader is desirable. There is a growing acceptance of this type of card for both physical and logical access control applications. Student identification, electronic passport, vending, parking and tolls are common applications for contactless cards.

Select Card Printer/Encoders can be with an optional e-card docking containing a contactless smart card encoder. Printer/Encoders equipped with this option are used to read and store information in the chip's memory, print on the front and back of the card (that complies e.g. with Mifare®/ISO 14443 standards) and encode either an ISO or JISII magnetic stripe, all in a seamless one-pass process.

4—Hybrid Cards

Hybrid card is the term given to e-cards that contain two or more embedded chip technologies such as a contactless smart chip with its antenna, a contact smart chip with its contact pads, and/or a proximity chip with its antenna, all in a single card. The contactless chip is typically used for applications demanding fast transaction times, like mass transit. The contact chip can be used in applications requiring higher levels of security. The individual electronic components are not connected to each other even though they share space in a single card. Hybrid cards offer a unique solution for updating existing badging systems. This e-card can accommodate the infrastructure and card technology of a legacy system while adding new applications and e-card technologies, all in a single ID card.

Select Card Printer/Encoders can be ordered with an optional e-card docking station containing any combination of up to three different types of e-card encoders. A printer/encoder equipped with all three enables the user to read and/or store information in the memory of three different embedded e-card chips, print on the front and back of the card, and encode either an ISO or JISII magnetic strip, all in a seamless one pass process. In this case, the e-card chips should comply with the specifications for the ISO 7816 standard Parts 1–4 (T=0,T=1), the Mifare®/ISO 14443 standard and/or HID Prox Cards standard.

5—Combi Cards

The combi card—also known as a dual-interface card—has one smart chip embedded in the card that can be accessed through either contact pads or an embedded antenna. This form of smart card is growing in popularity because it provides ease-of-use and high security in a single card product. Mass transit is expected to be one of the more popular applications for the combi card. In the mass transit application, a contact-type acceptor can be used to place a cash value in the chip's memory and the contactless interface can be used to deduct a fare from the card.

Select Card Printer/Encoders can be ordered with an optional e-card docking station containing a contact smart card encoder and/or a contactless smart card encoder. These printer/encoders can be used to read and/or store information in the chip, print on the front and back of the card and encode either an ISO or JISII magnetic stripe, all in a seamless one-pass process. In this case, the card complies e.g. with Mifare®/ISO 14443 standards and/or the ISO 7816 standard Parts 1–4 (T=0,T=1).

This discussion of the various types of smart cards is intended to illustrate the prior art, and to clarify the possibilities of using the prior technology in the present invention as a component of the Smart Documents.

Inventions in the Prior Art:

The Applicant's previous invention entitled "Bank Cheques System With Cheques Having Magnetized Strips And/Or Storage Chip, published as WO 01/41082 on 7 Jun. 2001, related to a Smart Document in the form of a bank cheque corresponding to the preamble of claim 1.

This earlier invention proposed a bank cheque system comprising bank cheques each having a front face and a rear face, the front face carrying imprinted visible data, the rear face for endorsement, and the cheque also carrying a magnetic strip or storage chip containing stored encoded data. The cheques had a thin portion carrying the imprinted and written visible data and a thick portion of plastic wherein the magnetic strip and/or storage chip is/are merged. The stored encoded data is readable by means of a reader so it can be checked for conformity with the visible data to detect any unauthorized alterations to the cheques. The stored encoded data includes an identification of a drawer account to ascertain if the drawer account contains a sufficient blocked amount to cover the amount of the cheque or not in prior cheques of this type, the thick portion could be at any convenient location and was usually a thickened edge.

This concept achieved a number advantages in secure operations using different types of pre-paid, fixed maximum value and variable-value cheques. The thick portion of the cheque with the magnetic strip and/or storage chip facilitated reading using standard readers for plastic credit cards. Moreover, placing the magnetic strip and/or storage chip in a thick plastic portion of the cheque enabled storage capacity for storing images such as the cheque bearer's signature, thumbprint and/or photograph.

GB 2351 379-A "Smart card with business partner scheme or travel application" disclosed a smart card usable in travel applications but mentioned that despite advances in information technology and process streamlining with respect to travel arrangements, the modern traveler is often subjected to unnecessary delays, petty inconveniences, and oppressive paperwork. These travel burdens are most evident in the airline, hotel, and rental car industries, where arranging and paying for services and accommodation can involve significant time delays due to miscommunication, poor record-keeping, and a host of other administrative inefficiencies.

It was stated that these cards remain incompatible; that is, due to differing file structures and/or communication protocols employed, card data typically cannot easily be shared across applications or between industry participants. Systems and methods were therefore needed in order to overcome these and other shortcomings in the prior art. A method and apparatus for a smart card system was provided which securely and conveniently integrated important travel-related applications in order to overcome the limitations of the prior art. In one aspect, a smart card system comprised cardholder identification applications and various additional applications useful in particular travel contexts; for example, airline, hotel, and rental car.

WO 9916015 "Contactless Proximity Automated Data Collection System And Method" proposed a fast data transfer collection system using message authentication and contactless RF proximity card technology in non-contact storage and retrieval applications.

In U.S. Pat. No. 6,097,292 "Contactless Proximity Automated Data Collection System And Method", a target provides control of an RF antenna and resolves collisions between multiple tags in the RF field. A tag provides reliable, high speed, and well-authenticated secure exchange of data/information with the host.

WO 00/57344 "Contactless Smart Card Reader" related to a contactless smart card reader formed by a visual display unit incorporating a display screen and a smart card power and reading antenna arranged to supply power to and read data from a contactless smart card placed adjacent to the screen. Preferably the antenna is formed behind the display screen and the contactless smart card is read through the display screen.

Applicant's pending but as-yet unpublished PCT application No PCT/IB02/02830 entitled "Boarding Passes with Encoded Data and Systems for Issuing and Processing Them", filed, 16 Jul. 2002, discloses a Boarding Pass and system for use in boarding passengers in aircraft or other means of transportation and/or while the passengers are aboard and/or after disembarkation. The Boarding Pass has a main coupon part and a passenger coupon part detachable from the main coupon part along a detachment line. The front face of the main coupon and passenger coupon parts carry visible printed data associated with spaces where passenger data and travel data are printed. A first magnetized strip and/or storage chip is merged in a thick portion on the main coupon part and a separate second magnetized strip and/or storage chip is merged in a thick portion on the passenger coupon part. The first and second magnetized strips and/or storage chips are separated from one another and spaced apart on either side of the detachment line. The first magnetized strip and/or storage chip stores encoded passenger data and travel data readable by passing the entire Boarding Pass or only the main coupon part through a suitable reader/writer, and the second magnetized strip and/or storage chip stores encoded passenger data and travel data readable by passing the passenger coupon part through a suitable reader/writer. The new Boarding Pass and system simplifies and speeds up passenger boarding and can be used for a wide range of applications including electronic clearance in case of change of airline, security checks, activities during transit including access to transit areas, point-of-sales transactions including duty-free shopping on ground or aboard, counting and checking the number of boarding passengers, automatic production of arrival cards or exit cards, luggage identification, collection and tracing/retrieval.

SUMMARY OF THE INVENTION

The invention relates to Smart Documents of the type according to the pre-characterising part of claim 1.

According to the invention, document's thick portion, i.e. wherein the magnetic strip and/or storage chip (contact or contactless) is merged, is a planar card attached to an edge of the document's thin portion in a manner allowing inclination of the card relative to the thin portion. This makes it very easy to pass the combined document through reading/writing devices, while the thickness of the card portion allows incorporation of magnetic strips and/or storage chips (contact or contactless) of high storage capacity, thereby achieving the advantages of the Applicant's prior Smart Cheques (WO 01/41082) in a much improved and more convenient manner, allowing also simplification of manufacture and versatility of use.

For this, the document's thick card portion has first and second parts that extend in opposite directions from their point of attachment to the edge of the thin portion, and is inclinable between a flat position and inclined positions. In the flat position, the first part of the card overlays an adjacent section of the thin portion, and the second part of the card protrudes beyond the attached edge generally in extension of the document's thin portion. This is the normal rest and storage position of the document. When the document's card portion is inclined relative to the thin portion, which is useful during transactions and particularly for gripping the card portion to pass the magnetized strip and/or storage chip (contact or contactless) though a reader, the card is at a variable angle to the thin portion, and the first and second parts of the card protrude in opposite directions from the attached edge of the thin portion at an angle to the adjacent section of the thin portion, such that the card can be inclined conveniently to the thin portion and the card's free edge can be passed through the reader/writer, whereas the thin portion can be folded such that it does not have to pass through the reader/writer.

The invention thus provides a combined document/card where the versatility of a Smart Card is combined with the functionality of the attached document. The Smart Document of the invention can for example be a cheque or paper value or other document for authenticating financial transactions; a passenger boarding pass for processing information relating to boarding passengers into means for transportation as well as disembarkation and ancillary functions during transit and for tracking and/or retrieving passengers baggage; an access document for controlling access to private or restricted areas; or a document for performing multiple security, identification, access and/or financial functions by means of the data encoded in the magnetic strip and/or storage chip and the imprinted visible data on the documents thin portion.

The new Smart Document is easy to manufacture and convenient to use. The inclinable thick card portion with its protrudable first and second parts facilitates gripping and manipulating especially for the purposes of passing the card though a reader. Moreover it fulfills all of the criteria for improvement in the security of using bank cheques set out in WO 01/41082, and can perform many other functions too.

The thin and thick portions of the document are usually both oblong with the long dimension of the card substantially equal to the short dimension of the thin portion, and the card is attached along its long direction to a narrow edge of the thin portion. This is the most usual configuration for many uses.

The thick card portion can for example be rectangular with rounded edges, which makes it convenient to handle, particularly for manipulation to pass the card portion through a reader/writer. The thin portion is typically rectangular, though other shapes are possible depending on the envisaged application.

Normally, either the first part of the card is smaller than the second part, or the first part of the card is larger than the second part. The larger of the two parts can then be used for carrying the magnetized strip or the storage chip (contact or contactless), with the smaller part being used for gripping, or vice versa, depending on design requirements. Alternatively, the first and second parts of the card could be of equal size.

In some embodiments, the card has an extension or tab on one of its edges (usually along a longer edge and that is narrower than its long dimension) and which protrudes from its first or second part. This extension or tab can be used for carrying the magnetized strip and/or the storage chip, or it can be used for gripping to pass the card through a reader/writer.

Such narrow extension or tab of the thick card portion can extend from its first part and overlay an adjacent section of the thin portion of the document in the flat position, or alternatively it extends from its second part and protrudes beyond and in extension of the thin portion of the document when in the flat position, i.e. it points away from the document.

The document's thin portion is made of paper or the like pliable sheet material suitable for the document in question and the thick card portion is made of plastic, cardboard or a laminated composite material that is generally planar but may flex slightly.

In addition to printed matter and spaces for entering writing, the document's thin portion may comprises a perforated section which should be remote from the edge to which the card is attached. This allows a section of the thin portion to be detached from the remainder of the document, the thick card portion remaining attached to the remnant part of the thin portion. This is convenient for many applications ranging from bank cheques, where a paper "stub" can be retained by the cheque's issuer, or for airline boarding passes where part of the document can be detached for control and security purposes, whereas the part retained by the passenger will include the card portion that can be used for operations during transit, for baggage tracking, and so on.

The document's card portion is attached to the thin portion by gluing, lamination, and/or bonding. In particular, the thin portion can be extended by an integral thin layer which is merged with, laminated into or bonded to one face of the second part of the thick card portion. This attachment allows the card portion to freely incline relative to the thin portion.

The thickness of the card portion should preferably correspond to that required according to the specifications of standard reader devices for standard credit cards. In this way, the new Smart Documents can be used with existing readers. Conveniently, the thick card portion can have more-or-less exactly the same dimensions as a standard credit card.

When the Smart Document includes a magnetized strip, this is usually and preferably merged on the front or rear face of the thick card portion adjacent a long edge thereof which is arranged to be the free edge when the card is gripped. This facilitates passing the magnetized strip through a reader.

When a storage chip (contact or contactless) is included it is usually merged on the front or rear face of the thick portion and located centrally or slightly off-centre thereon. The exact location can be chosen according to the specifications for inserting the storage chip in a reader.

When a magnetized strip or storage chip is merged in one of the first and second parts of the inclinable card portion, the other of the first and second parts of the inclinable card portion can be left accessible so that when the card portion is inclined to the thin portion it can easily be gripped for passing the magnetized strip and/or storage chip through a reader.

The magnetic strip and/or storage chip possibly contains an image of at least one identification means for identifying the company, organization, or any other authority or for identifying the document holder, such as an image of the holder's thumbprint or fingerprint or a portrait photo. The stored encoded data stored on the magnetized strip and/or storage chip may comprise a signature.

The invention includes issuing the new Smart Documents with front and rear faces carrying visible printed information and magnetic strips and/or storage chips where invisible information is encoded stored and readable via a suitable reading device so the visible information can be matched with the stored encoded information to discover any unauthorized modifications in the Smart Documents.

The invention aims to take care of the requirements of particular applications by centralizing all operations pertaining to the applications thereby avoiding waste of time and energy through a central Smart Document system for a particular use or for multiple uses.

By placing magnetized strips and/or storage chips on the thick card portions of the Smart Documents, the storage capacity can be increased and each can be easily programmed with the requisite encoded data that can also be read from each part of the Smart Document and with greatly reduced risk of damage thereto. This enables the Smart Documents to be used for a wide range of applications including electronic clearance in case of change of the dealing parties and for security checking. Moreover, the facility for inclining and gripping the card portion makes for ease of handling.

As mentioned, the Smart Document can for example be a bank cheque, an access pass, a boarding pass of a transport system, or a multipurpose document for performing multiple security, identification, access and/or financial functions by means of the data encoded in the magnetic strip and/or storage chip and the imprinted visible data on the thin portion.

It can be used inter alia for authenticating financial transactions, for controlling access to restricted or private areas, for processing information relating to boarding passengers into means for transportation, for tracking and/or retrieving passengers baggage, or for performing multiple security, identification, access and/or financial functions.

The system's capacity for writing and reading on magnetic strips and/or storage chips (contact and/or contactless types) fixed on thick card portions of plastic offers the possibility of completely registering all of the requisite particulars on the Smart Documents, for instance passengers particulars and flight details in the case of a Boarding Pass.

The process for producing the Smart Documents comprises printing visible data on the front and/or back of the thin portion and encoding data in the card's magnetic strip and/or storage strip before and/or after the card is attached to the thin portion. This greatly simplifies production as the card and paper portion can be produced separately and assembled, as desired. At least part of the encoded data corresponds to the printed visible data. The degree of correspondence will depend on the application.

All particulars of the document can be readily and immediately accessed by passing the Smart Documents or inserting the same in devices for reading all particulars stored in the magnetic strips or the contact and/or contactless storage chips fixed on thick edges of plastic or otherwise. Such thick parts can have standard specifications suitable for available writing and reading equipment. Such reading of the information saves time consumed in rewriting.

The card portion of the document is usually passed through the reader while the card portion is attached to the entire paper portion which can be folded by the user so as not to interfere with passage of the free edge of the card in the reader.

For some applications, a part of the paper portion can be detached before passing the card portion through a reader, in this case with a remnant section of the paper portion still attached to the card. This is the case notably for Boarding Passes, where a section of the boarding pass is retained before departure and the passenger keeps the passenger coupon part which includes the inclinable card portion. This retained part can be used by the passenger for transit operations, security checks, purchases or baggage tracking and retrieval, as disclosed in PCT IB/02/02830.

Information can be circulated locally without having to rely on a main communications system between the dealing authorities and any other bodies, using the storage chips of the contact and/or contactless types fixed on the thick card portions.

There is a possibility of writing and circulating all particulars for a Smart Document by passing or inserting the Smart Document carrying the magnetic strips and/or storage chips (contact and/or contactless) fixed on thick card portions in a suitable reading device, whereupon all particulars would be displayed immediately and can be circulated and printed in a proper, secure and accurate manner.

All particulars of the Smart Document can be verified automatically by passing or inserting the Smart Documents carrying the magnetic strips and/or storage chips (contact and/or contactless) fixed on the inclinable card portions in a suitable reading device, with the possibility of separating and circulating all its particulars immediately without errors and without wafting to write these particulars manually or by using a computer keyboard.

Only a few minutes are required for issuing the Smart Documents, verifying, checking all its particulars on the magnetized strips or the contact and/or contactless storage chips fixed on inclinable card portions. The information can immediately be circulated without any delay, which saves time and efforts of the dealers.

Characteristics of the Smart Documents Read/Writing Devices

The Smart Documents system includes reading devices or reading/writing devices, that is units or devices installed at different places for reading and processing the new Smart Documents. These reading/writing devices are characterized by the following:

They have the ability to read and display the original signature stored in an image or letters, symbols and numbers on the magnetized strip itself or stored in the storage chip, which can be stored image ("scanned image") of the signature of the document holder. The Scanned image can also be a thumb or fingerprint or a photograph of the holder.

The reading/writing device can be connected to a personal computer where the stored information like the signature, image, fingerprint and photograph images can be read and displayed as a means of security. Connection shall be by various methods including direct connection through RS 232 or RS 422 etc or through an internal or external connection or wireless.

This reading/writing device is characterized by the ability to read magnetized strips and/or storage chips (contact and/or contactlesss) and it can additionally include a personal computer connected with the reading unit. The reading/writing device can be suitable to read contact and contactless types of storage chips.

The reading/writing device would be connected to a sub-server through communication systems allowing such connection.

The new Smart Documents (of plastic paper or otherwise) are issued with the approval of the participations in the system according to the invention, and the reading devices will be adapted to the adopted forms of the new Smart Documents, for example the various embodiments shown in the accompanying drawings and described below.

The reading/writing devices can be fixed or can be hand-held devices. For most locations, it is preferred that the devices will have reading and writing capacity, that is the device can input data for storage in the magnetized strips and/or storage chips and for communication of data via communications systems. Depending on the location, the devices may have a limited writing capacity or limited access via a PIN code, so that certain categories of data cannot be erased or altered by that particular device.

The reader devices can read the storage chips and magnetized ships as well as bar codes, electronic tape, zebra code, etc., that can be used on a passenger's baggage.

All the above components shall be connected together through an integrated net, forming part of a communications system.

Manipulation of the new Smart Document to insert the card in a reader/writer is particularly simply and convenient, thanks to the inclinable card portions.

Methods of Making the Smart Documents with Magnetized Strips and/or Storage Chips on a Thick Portion The Smart Documents are made of suitable paper, for example by the following method:

The Smart Documents are made with a rectangle of adequate paper or pliable thin card, in accordance with the standard recognized dimensions of ordinary documents for the same application: bank cheques, boarding cards, and so on. However the new Smart Documents include at least one inclinably mounted thick portion or card which is in accordance with the standard specifications that suit reader systems to be able to deal with the data reading machines, in particular the standard readers in use at present.

This inclinable thick portion or card will be merged with magnetic strips and/or storage chips, on which the required data and particulars for Smart Documents will be programmed. Such encoded particulars and information will be invisible but readable by currently available readers.

As for the balance area of the Smart Documents carrying the visible printed data, this will be of thin ordinary pliable writing paper on the face of which the ordinary particulars of the Smart Documents will be printed as per the drawings (see below). The paper can bear pre-printed data and can additionally be writeable by hand or computer printing in the appropriate spaces visible data that may in part correspond to encoded data stored in the magnetized strips or storage chips.

For example, a Smart Document is made by the following steps:—

1—The thick portions of the Smart Documents have a magnetized strip and/or storage chip (contact and/or contactless) merged with any appropriate paper or made from any suitable material (e.g. PVC (polyvinyl chloride), PE (polyethylene), ABS (acrylonitrile-butadiene-styrene), PET (polyethylene terephthalate) or the like, whose dimensions and thickness are in accordance with the required standard specifications allowing writing and reading through standard readers/writers. The storage chips can be contact and/or contactless chips, as described previously.

2—The Smart Documents carry all the required particulars mentioned in the description or illustrated in the drawings and any other information necessary for the interested parties, the same particulars on the front face of the Smart Documents (or at least part of these particulars) are stored on the magnetized strip and/or storage chips so that they are invisible but readable by suitable readers. See WO 01/41082 and PCT/IB02/02830 for further details.

3—The rear paper face (the back leaf) of the Smart Documents can be printed or left for writing any additional required data.

4—The magnetized strips and/or storage chips may be merged on the front or rear face of the thick portions of the Smart Documents near one of the sides with dimensions to suit the current readers, so they can be easily read with available systems.

5—Also the magnetized strips and/or storage chips may be merged in any suitable place of the thick card portions of the Smart Documents other than those mentioned above.

The Smart Documents with their storage chips and/or magnetized strips are made of any suitable type of plastic and paper or any other suitable material, in accordance with the recognized dimensions of ordinary conventional documents for the same use as the Smart Documents, or any required dimensions. Magnetized strips and/or storage chips are merged on the thick card portion so that it will be difficult to separate and remove them, while this thick part allotted for the strip/chip will have an area and thickness suitable for the readers/writers. The remainder of the Smart Document is thinner, namely of the ordinary thickness of standard paper or other pliable sheet material used for known documents for the same application.

The thick card portion will be merged with paper ply by any method of calendaring/pressing (i.e. thermal lamination), and the storage chip and/or magnetized strip will usually be uncovered.

For instance, the thin portion can have the usual thickness of a standard documents, and the thick card portion can be several times thicker while remaining compatible with the standard reading devices, say from 100 Micron to 900 Micron or any other suitable thickness.

The storage chip (or the magnetized strip merged in a thickened portion) provides the possibility to record and store a large quantity of particulars, whether such particulars, data and information are magnetized, coded, or ciphered as required, and whether they are pictures, particular information, or codes.

Furthermore, it is possible through these magnetized strips and/or storage chips to ensure the soundness and reliability of these Smart Documents, and to provide correspondence of their particulars with those printed on the thin portion of the Smart Documents, as well as secure processing thereof. They also enable checking of all the particulars of the document holders/dealers, the Smart Documents themselves, and the signature, the photograph or the thumb impression to confirm the soundness and correctness of these Smart Documents. Also these magnetized strips and/or storage chips of high storage capacity avoid the traditional defaults of standard known documents of the same category.

It is possible to make a Smart Document with magnetized strips and/or storage chips by other methods, for example: the paper of the Smart Document's thick card portions may be made from paper merged with a plastic portion with standard specifications in accordance to the reading/writing devices, or other means could be used to fix the magnetized strips and/or storage chips in the card portion. A plastic card portion could be fixed on the upper side of the Smart Documents or on the bottom. This plastic card portion could be mounted in an inclinable way in any suitable place on the Smart Documents that is suitable for the reading/writing device, and at a convenient location for it to be gripped by the user in particular for passing the card portion through a reader/writer. Reference is made to the drawings as non-limiting examples.

Thus, the new Smart Documents and methods of processing the Smart Documents are able to confirm the correctness and integrity the Smart Documents, and to immediately discover any illegal changes.

The storage chip and/or magnetized strips merged on the inclinable thick card portion of the Smart Documents could be merged in any suitable place on the front or rear side. The thickness and specification of the Smart Documents in the merged area with the storage chip and/or magnetized chip should be accordance to the specific standard of the reading/writing devices.

The Smart Documents can incorporate normal storage chips or Proximity contact chips, or both, and be read/encoded using standard reading/writing devices suitable for these chips.

BRIEF DESCRIPTION OF THE DRAWINGS

The drawings show, by way of non-limiting example, several embodiments of the Smart Documents according to the invention, and associated equipment. In the drawings:

FIGS. 38-A and 38-B illustrate the method of reading and writing the storage chips in detail.

FIG. 38-C is a perspective view of a device for reading the magnetized strips and storage chips of the Smart Document's card portion.

DETAILED DESCRIPTION

Figure 1:
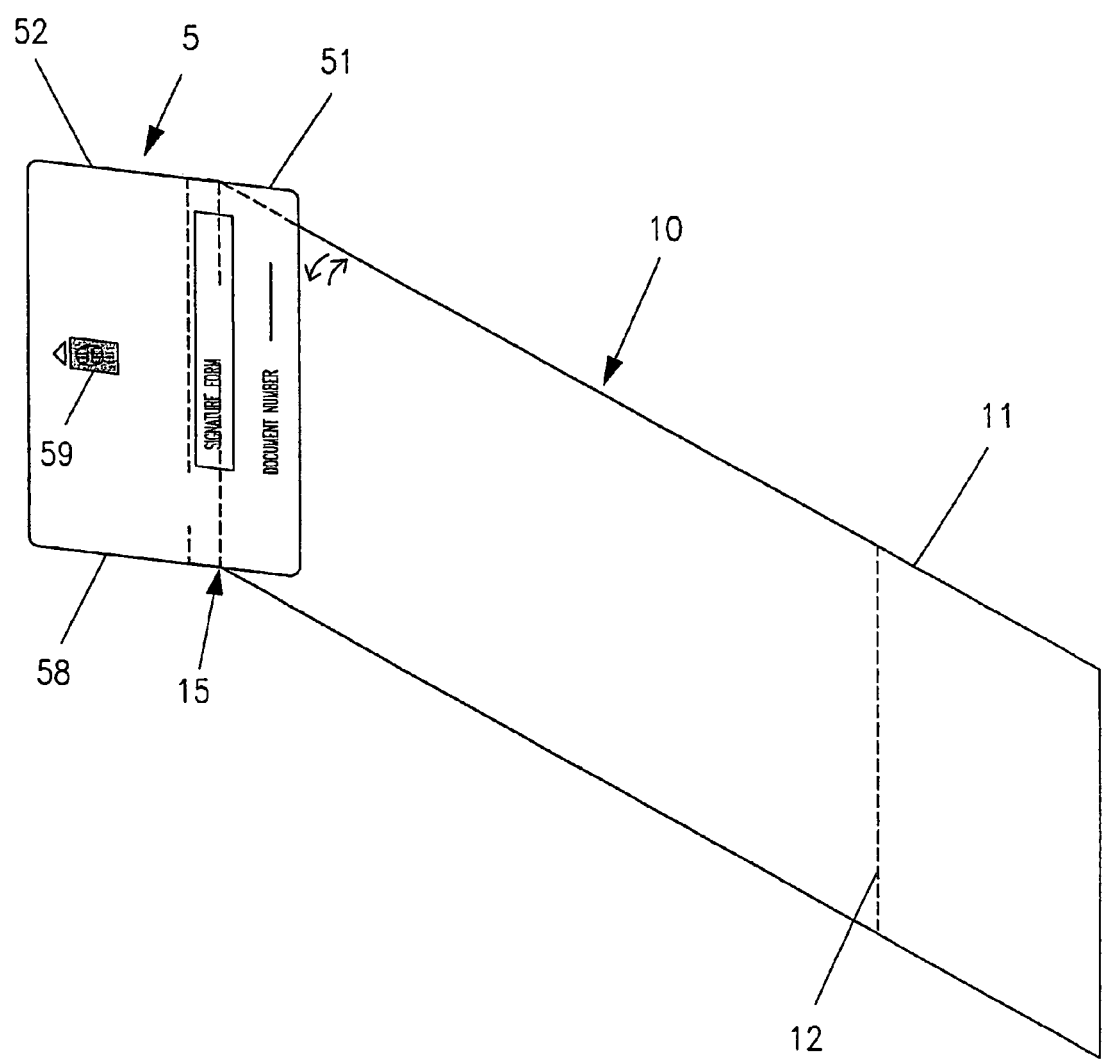
FIGS. 1 to 16 are schematic front perspective views of different embodiments of Smart Documents according to the invention having a storage chip, shown with the thick card portion in an inclined position.
Figure 2:
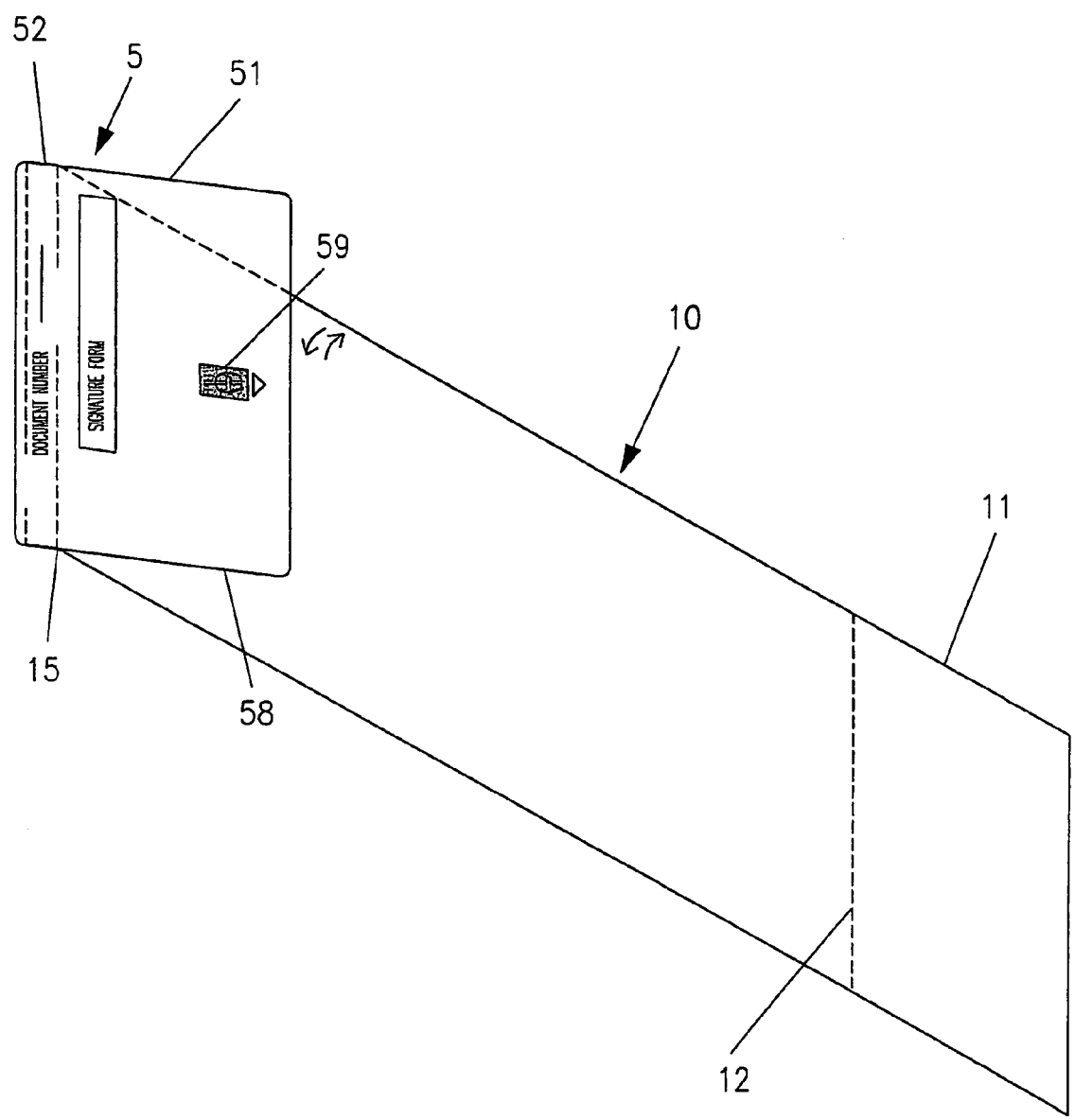
Figure 3:
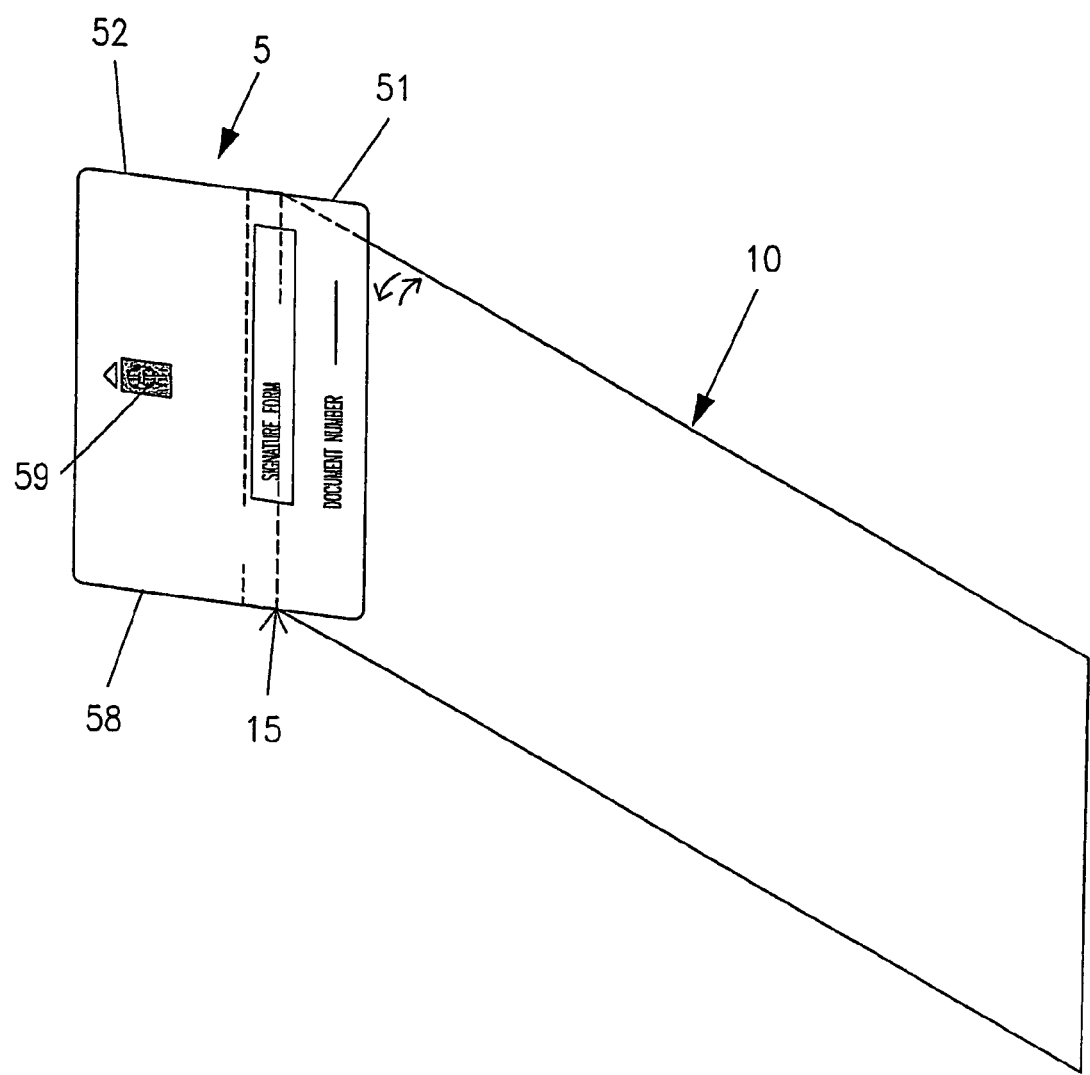
Figure 4:
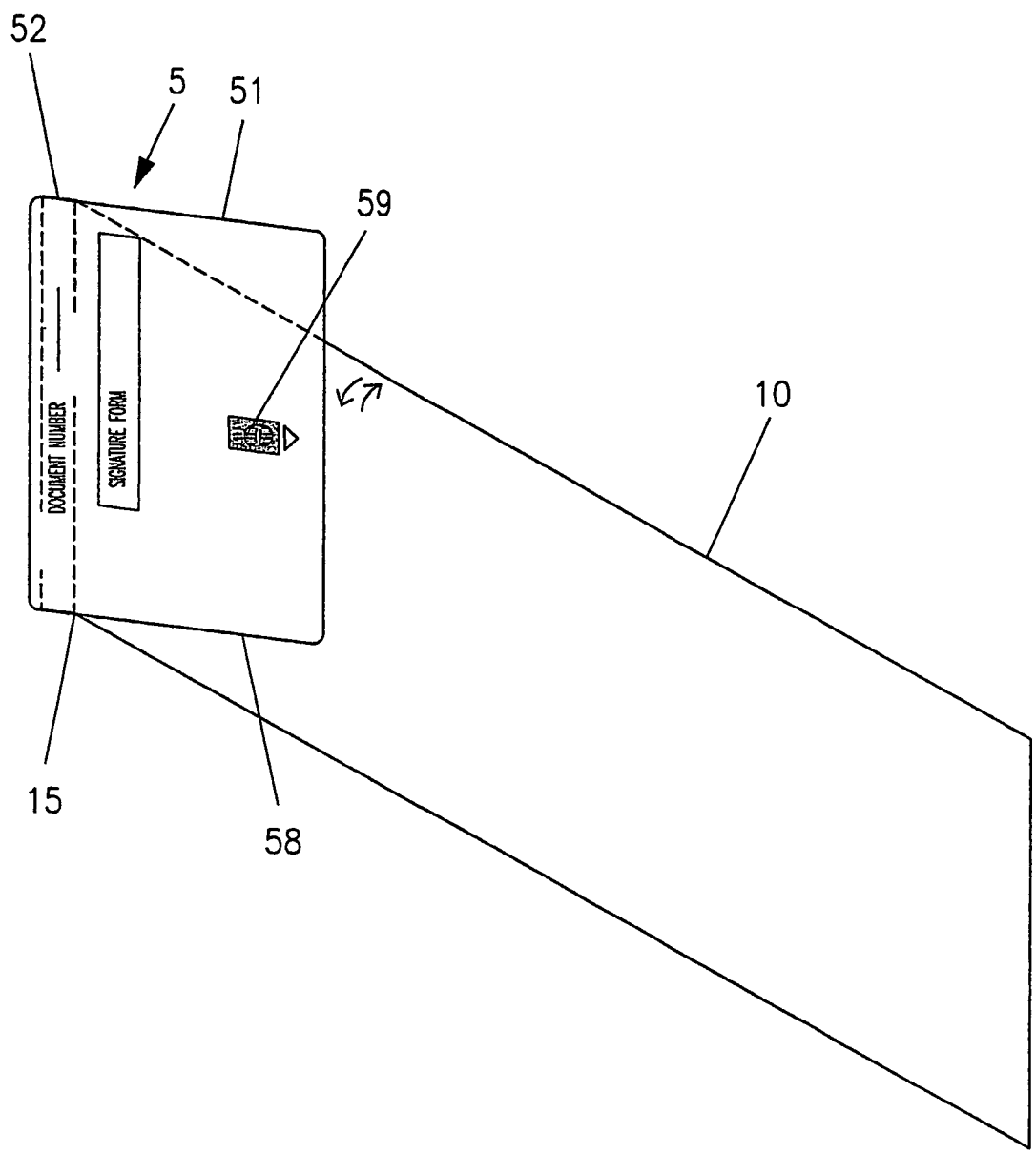
Figure 5:
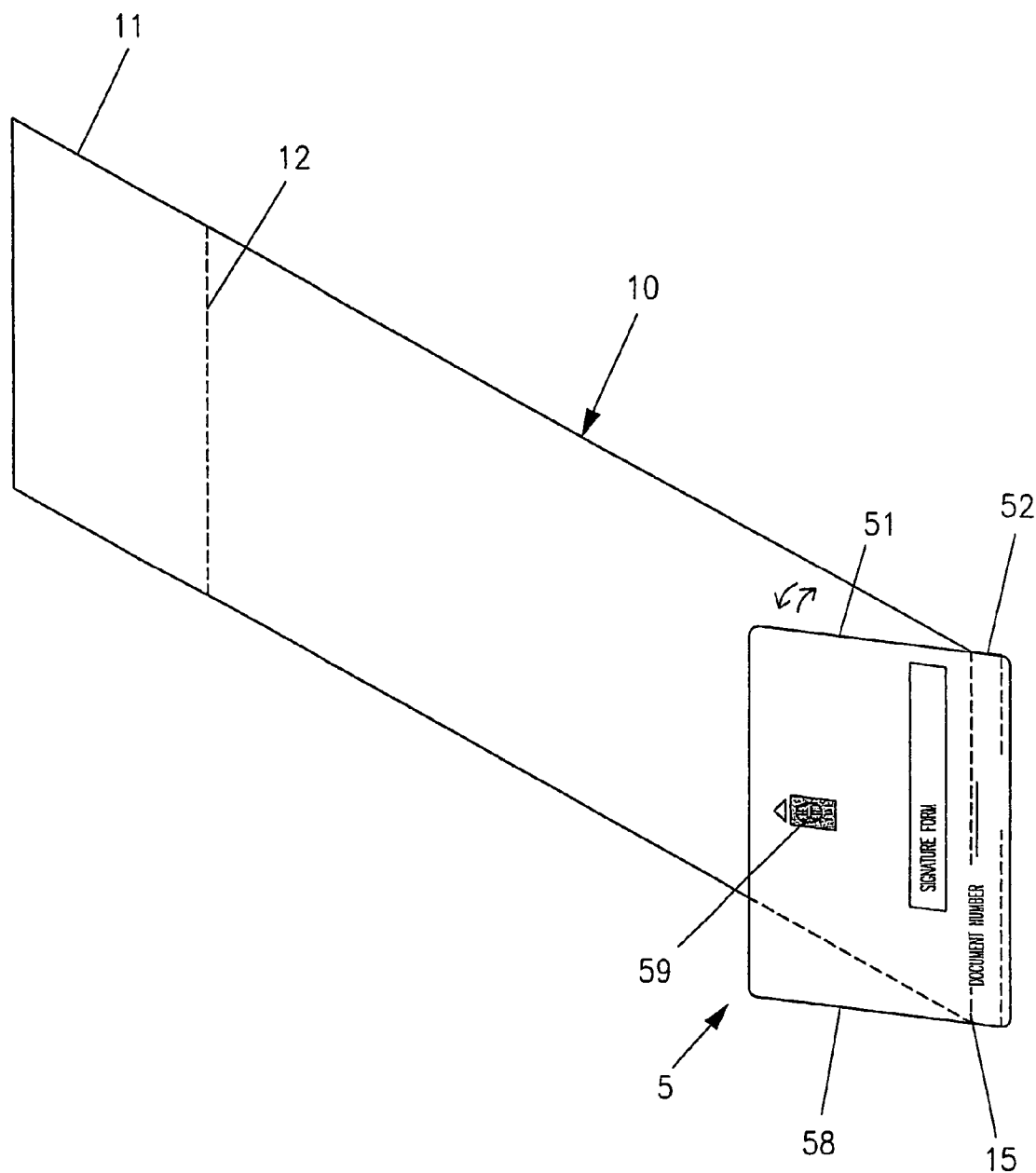
Figure 6:
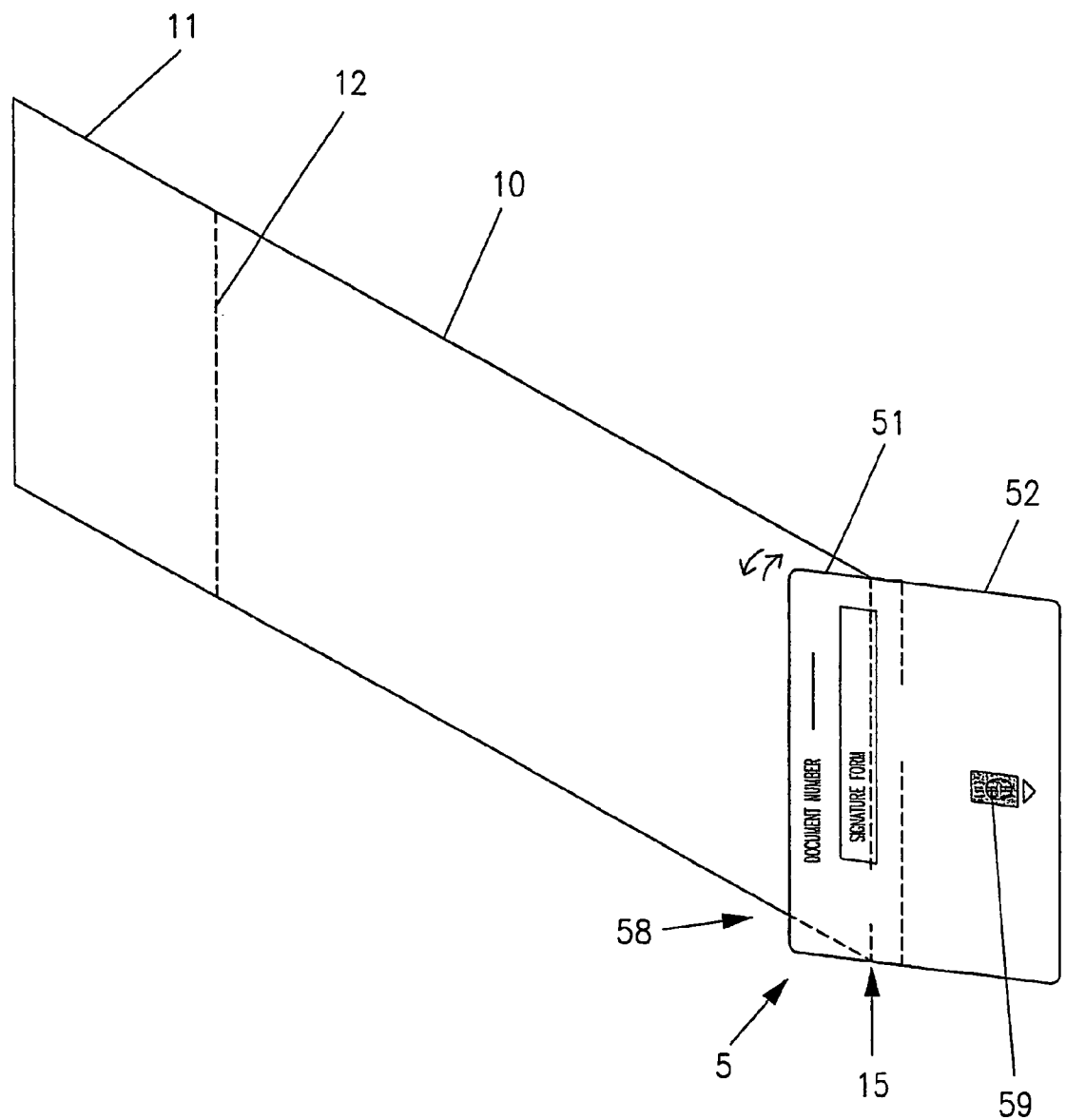
Figure 7:
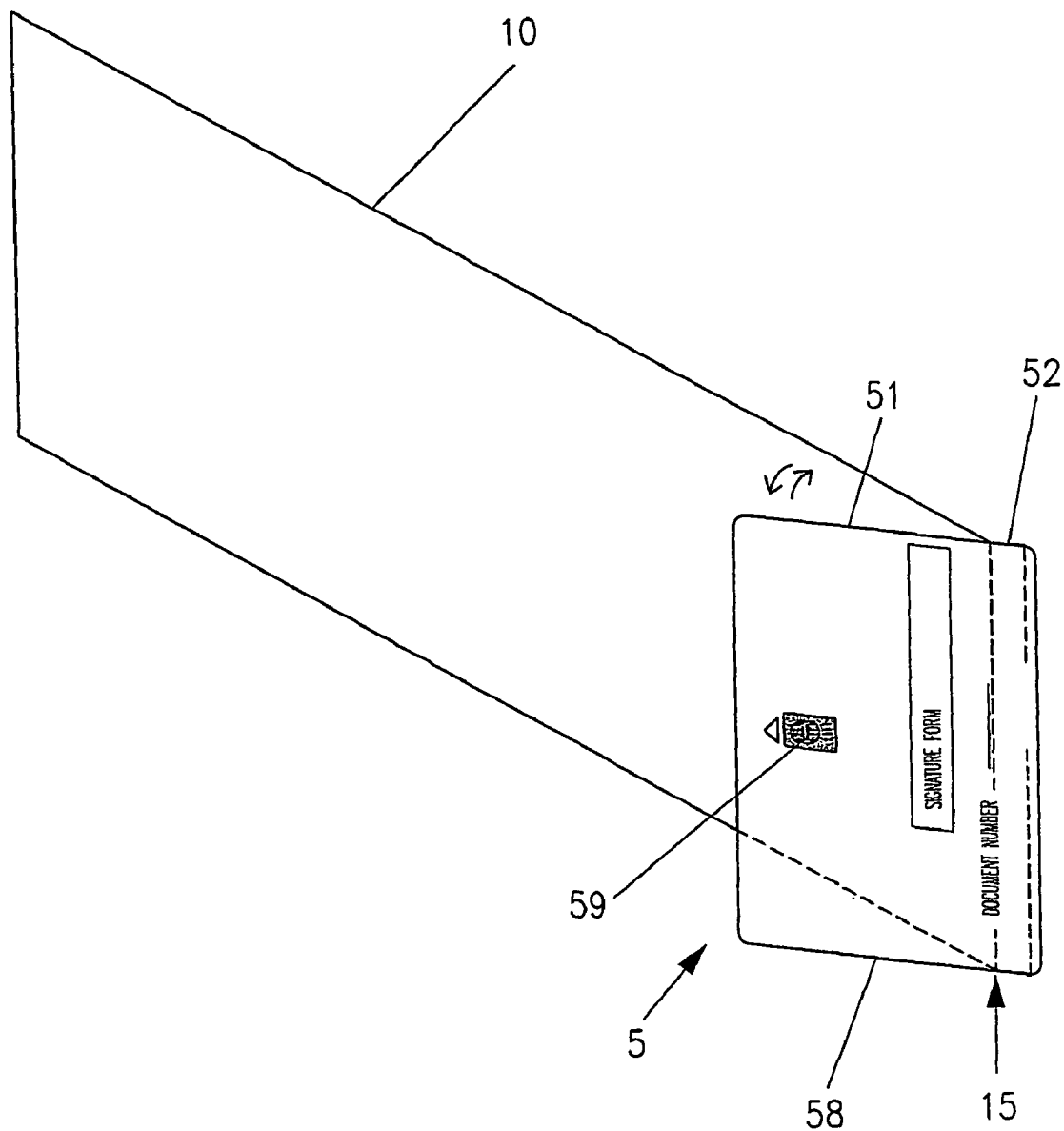
Figure 8:
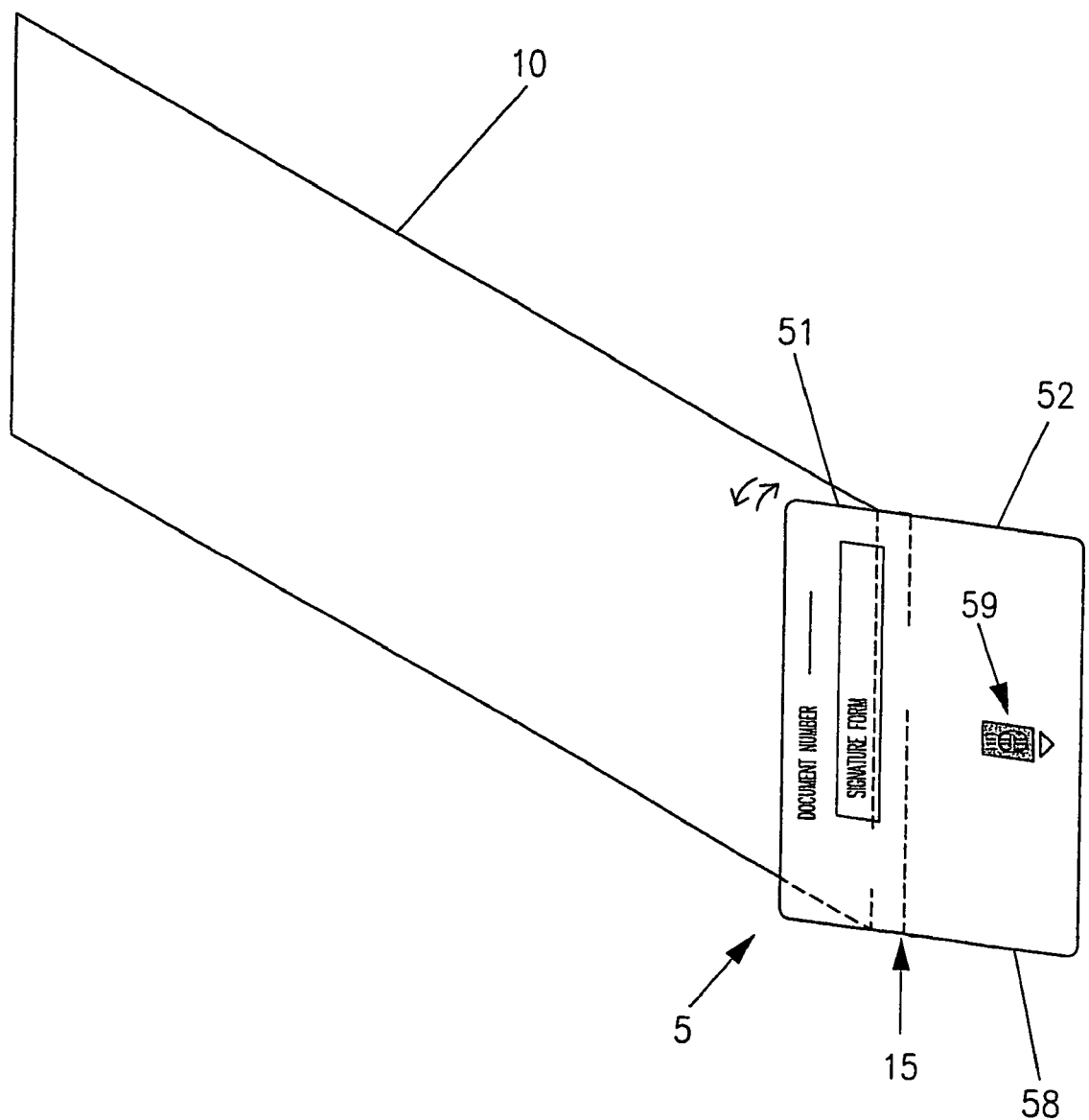
Figure 9:
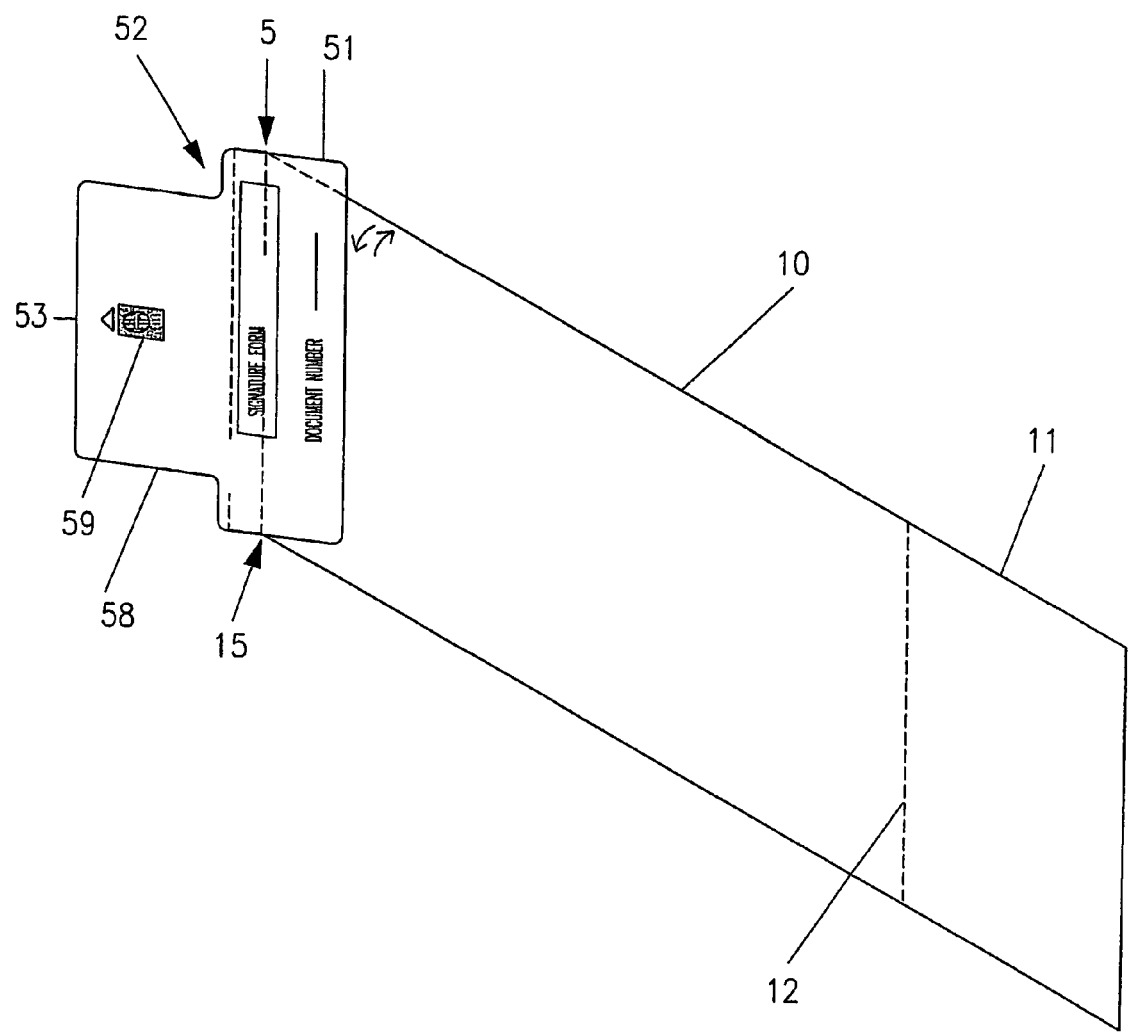
Figure 10:
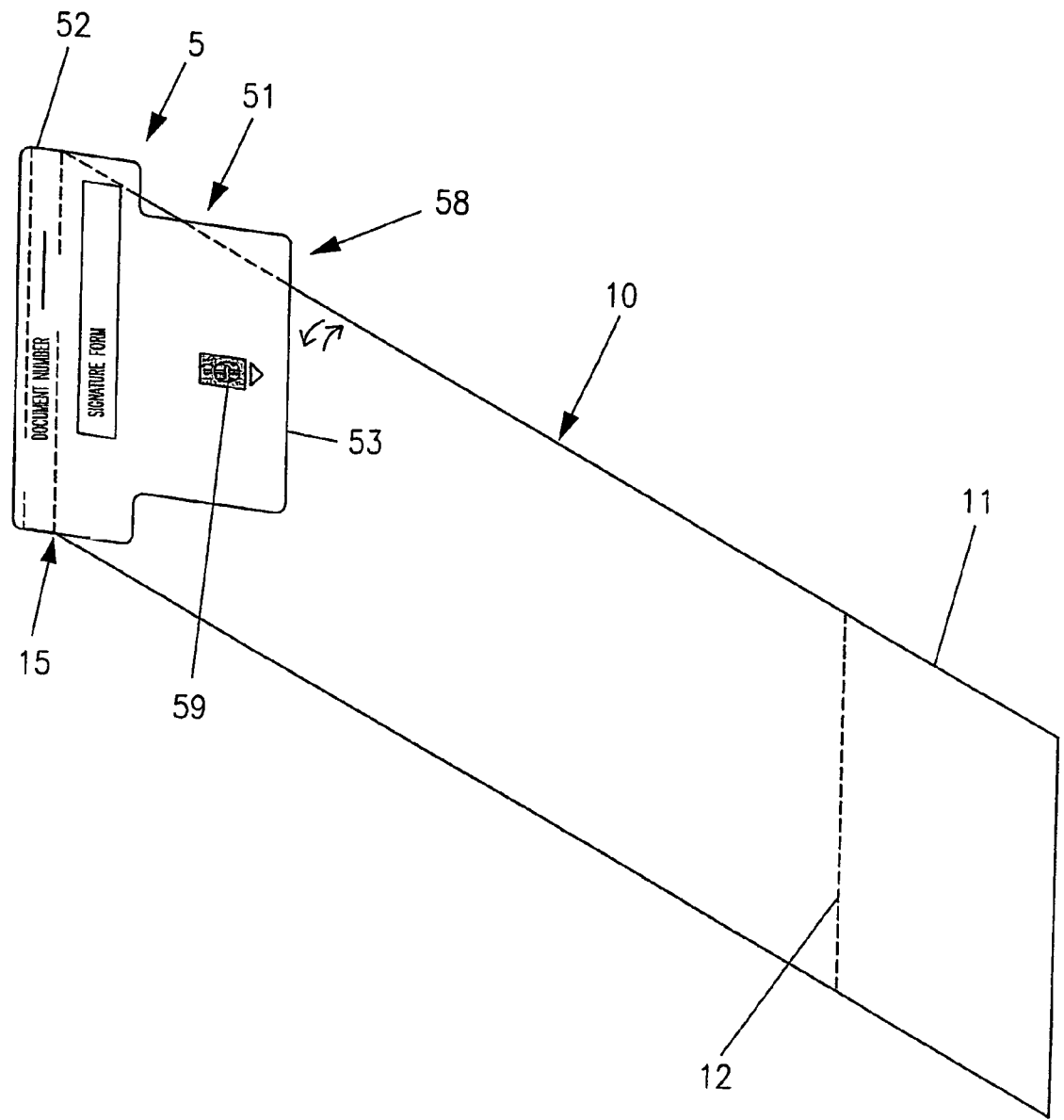
Figure 11:
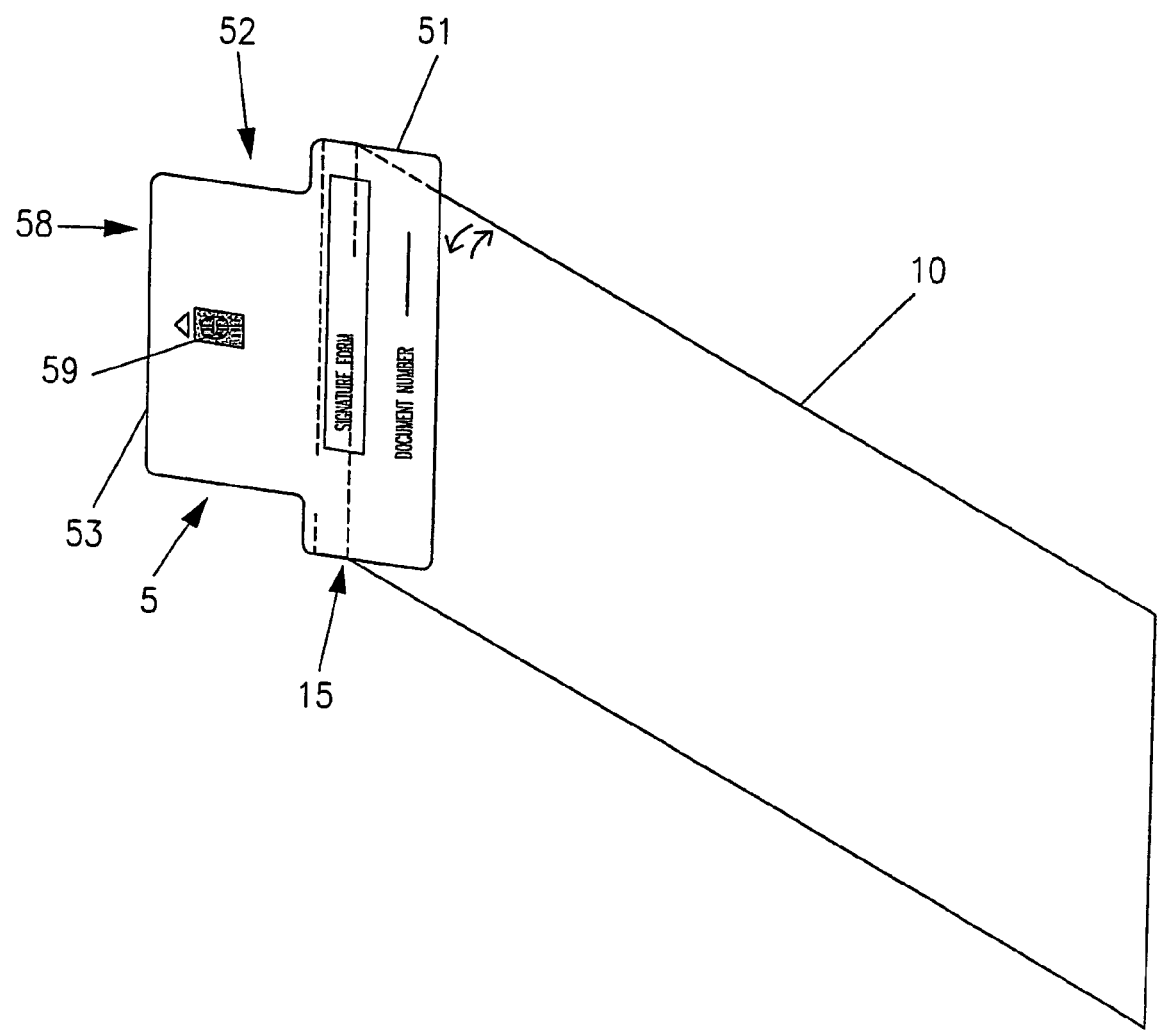
Figure 12:
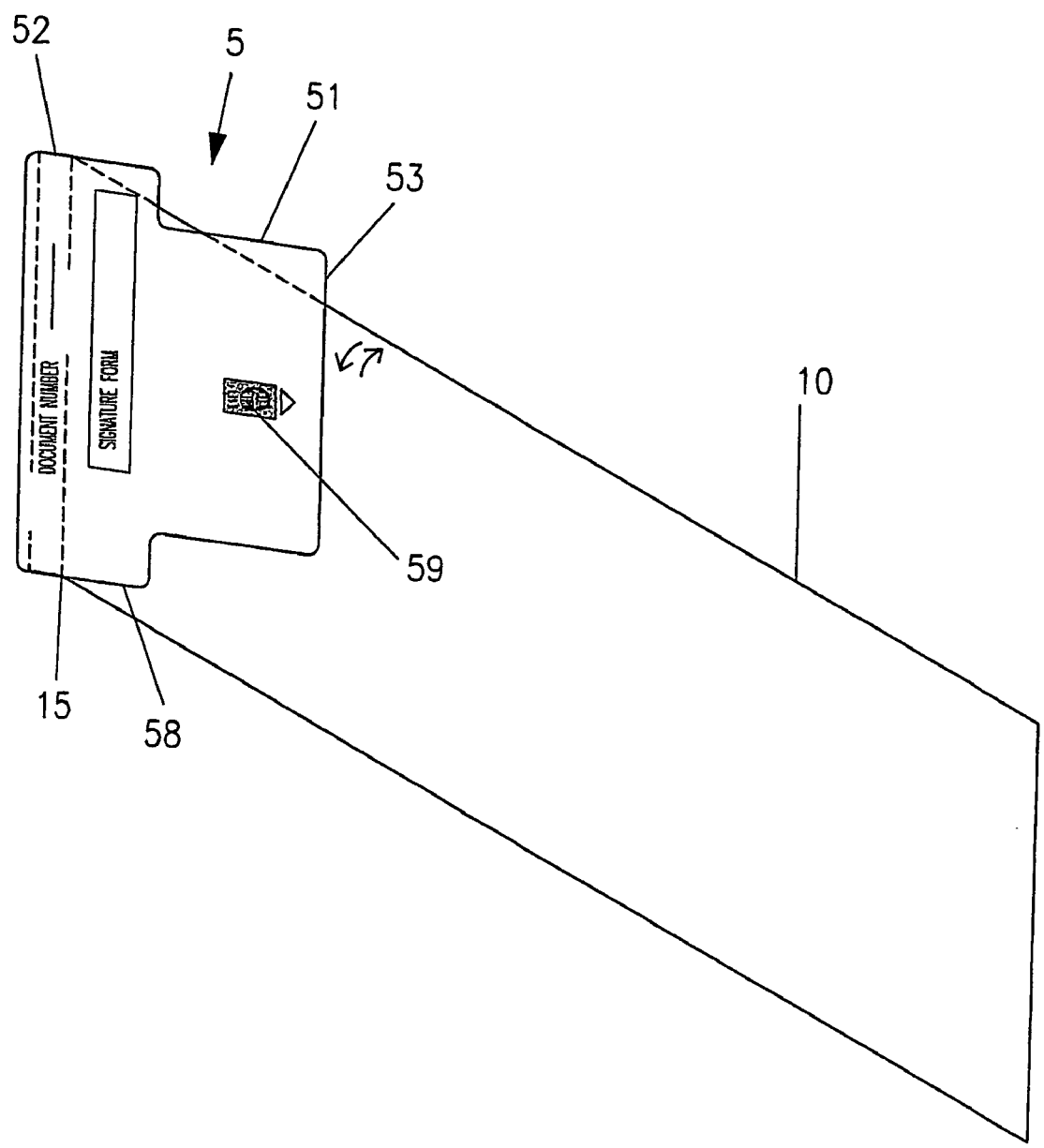
Figure 13:
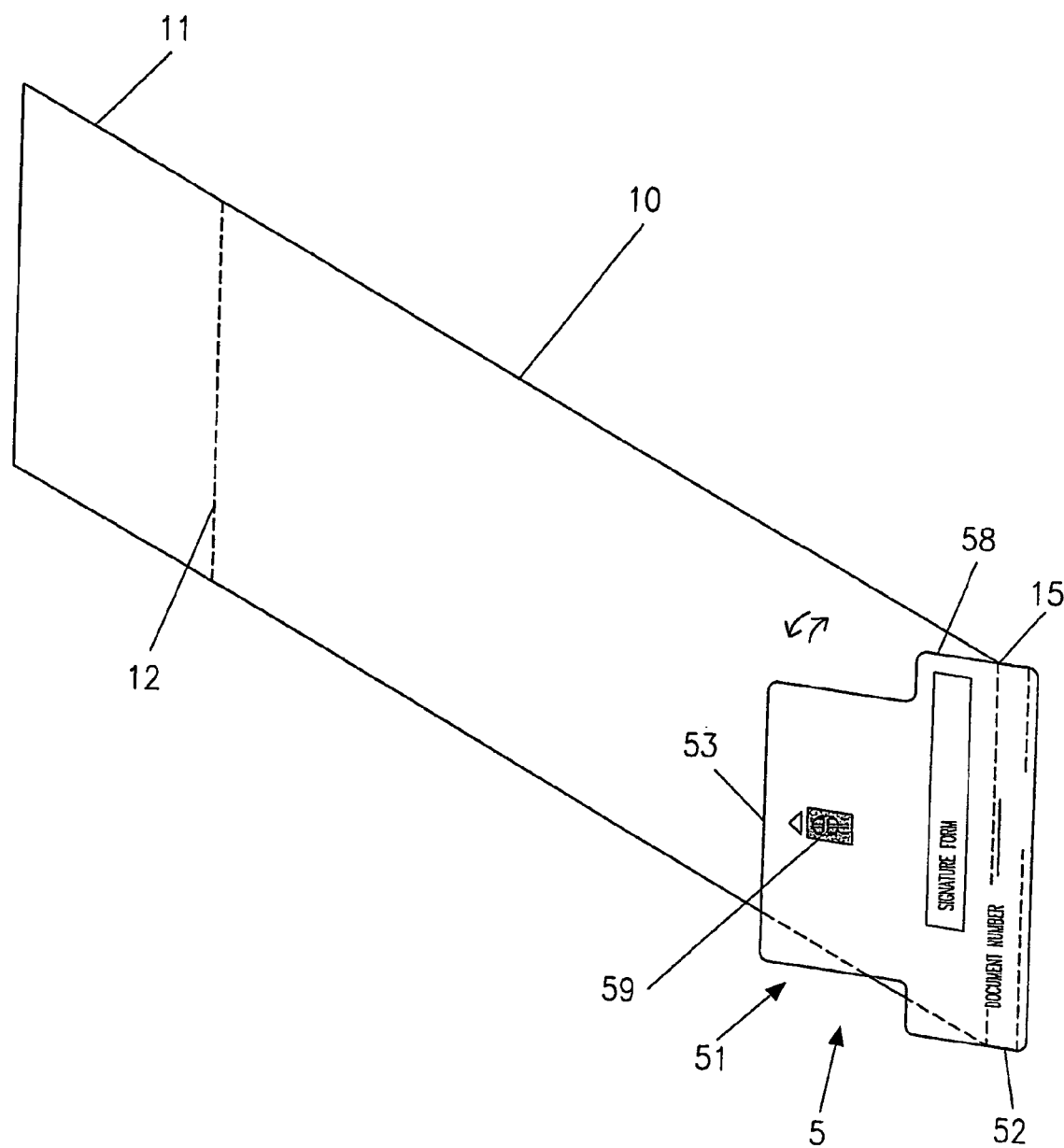
Figure 14:
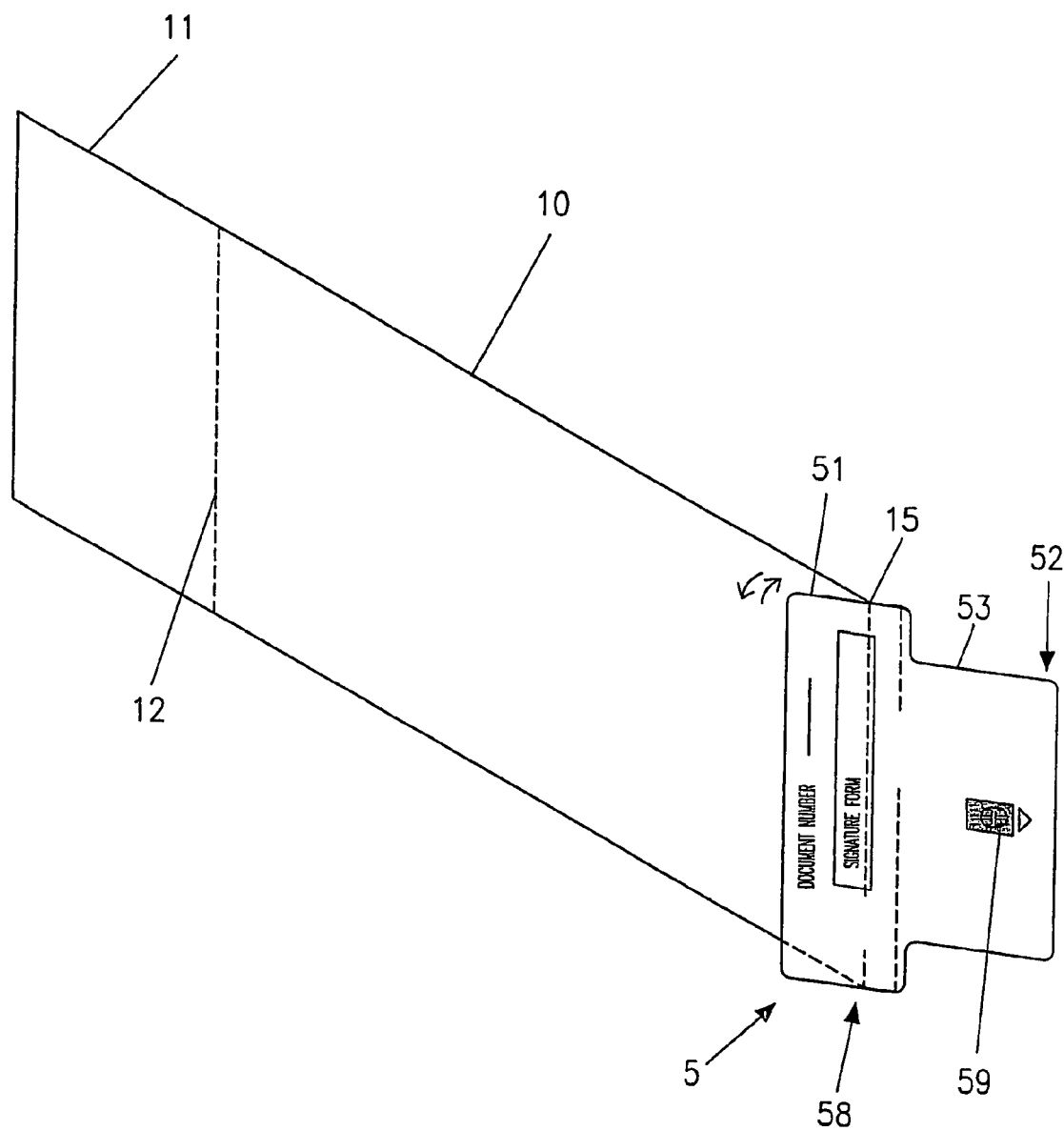
Figure 15:
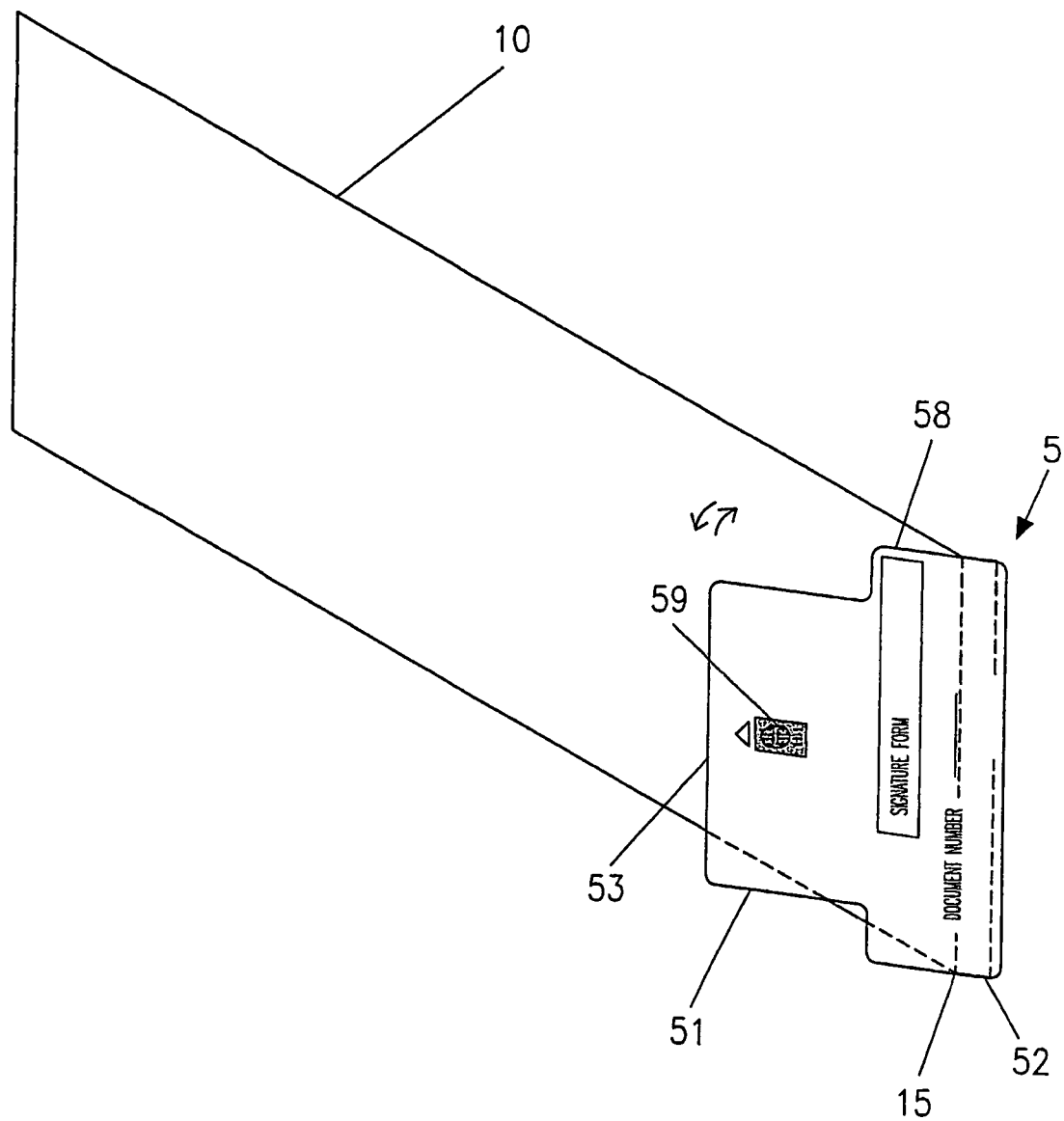
Figure 16:
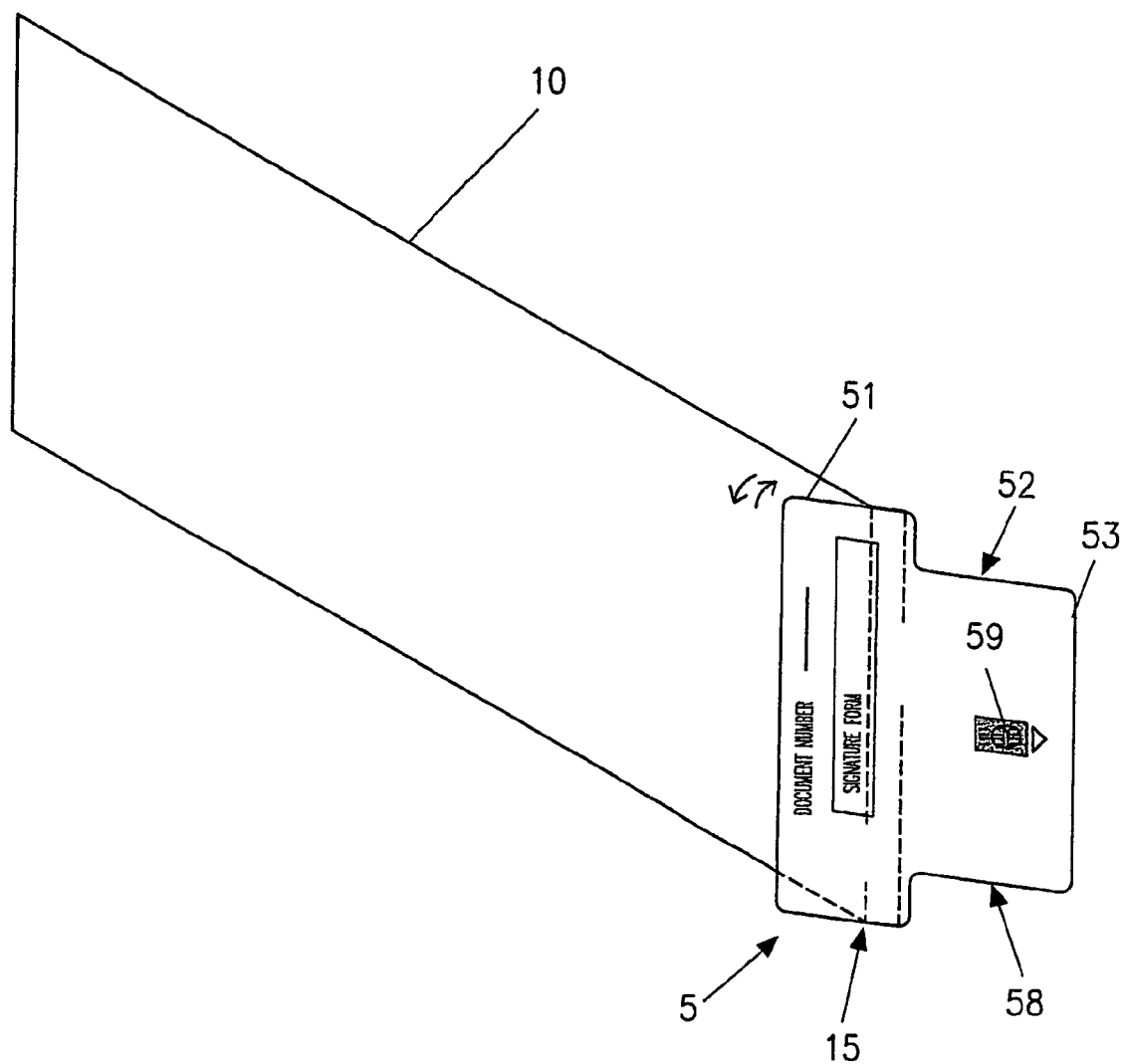
Figure 17:
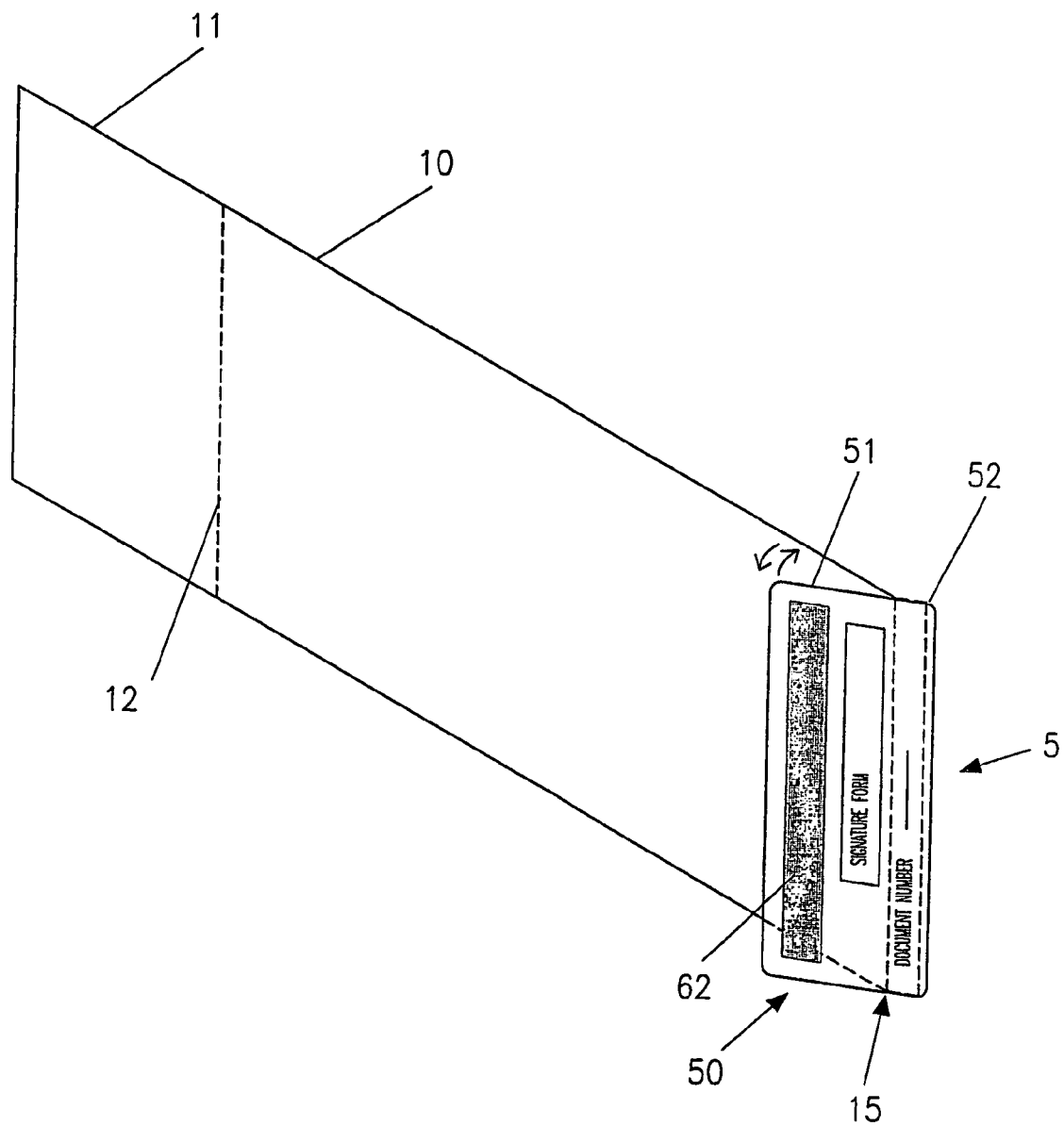
FIGS. 17 to 24 are schematic front perspective views of different embodiments of Smart Documents according to the invention having a magnetized strip, also shown with the thick card portion in an inclined position.
Figure 18:
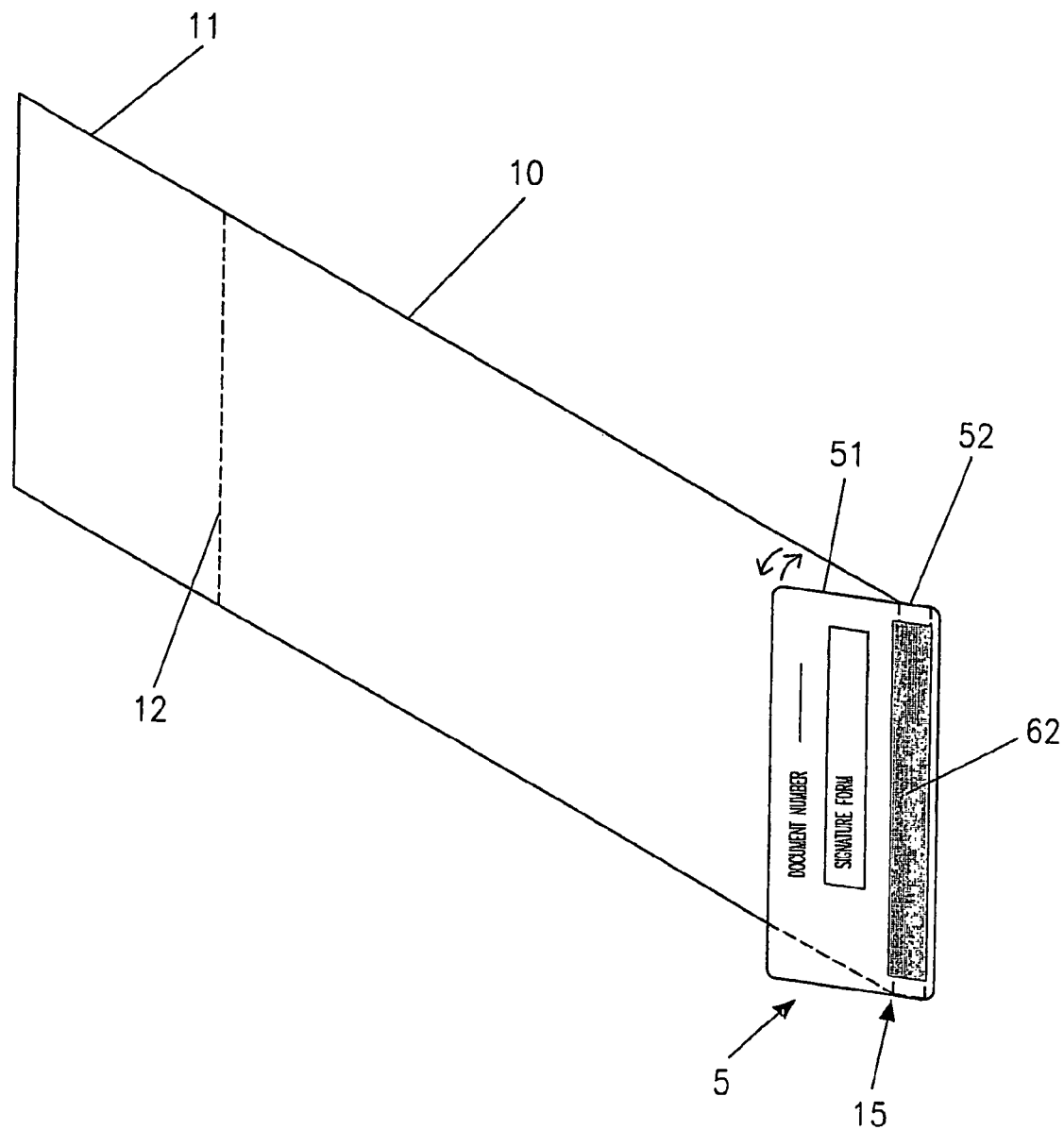

FIG. 1 shows a first embodiment of a Smart Document according to the invention comprising a pliable thin paper portion 10 carrying on its front and/or rear face imprinted visible data (not shown). Specimen printed data for a "maximum-limit" cheque would for instance include the cheque number, maximum limit of the cheque, the name of the issuing bank, a location for the cheque drawer to write in the name of the beneficiary, locations for the drawer to write in the amount to be paid in numbers and in words, the name of the drawer, the bank code number which contains:—(cheque number, bank's and branch name, drawer's cheque account number), a space for signature, a space for entry of the date, and identification of the cheque. In its right hand part 11, the front face of the cheque optionally has printed information enabling the drawer to keep track of the balance of his current account when each successive cheque is written. This part can, if desired, be detachable from the main part of the cheque by a perforation line 12, forming a slip that can be retained by the drawer. For further details and examples of Smart Cheques see WO01/41082.

For other applications, for instance as a Boarding Pass, the appropriate information is printed on the respective parts of the paper portion 10. See for example PCT/IB02/02830, also see FIGS. 39 and 40.

To one end of the paper portion 10 is attached a thick portion 5 wherein a storage chip 59 is merged. The storage chip 59 stores encoded data that is readable by means of a reader. The thick portion 5 of the Smart Document of the invention is in the form of a planar card 58 attached to an edge 15 of the document's paper portion 10, in a manner allowing inclination of the card 58 relative to the paper portion 10, as indicated by the arrows.

The card 58 is divided into a first part 51 and a second part 52 on either side of the attachment to the paper portion 10 at the edge 15. The card 58 is inclinable between:

a flat position (see FIGS. 25 to 36), in which the first part 51 overlays an adjacent section of the thin portion 10, and in which the second part 52 protrudes beyond the edge 15 generally in extension of the thin portion 10, and inclined positions in which the card 58 is at a variable angle to the paper portion 10, and in which the first and second parts 51,52 protrude in opposite directions from the attached edge 15 of the thin portion 10 at a variable angle to the adjacent section of the thin portion 10 which can fold to accommodate for inclining of the card 58.

The paper portion 10 of the document and its attached card 58 are both oblong. The long dimension of the card 58 is substantially equal to the short dimension of the thin portion 10, and the card 52 is attached along its long direction to narrow edge 15 of paper portion 10. As shown by way of example, FIG. 1's card 58 is rectangular with rounded edges.

In the embodiments of FIGS. 1 to 16 a storage 59 chip of the contact and/or contactless type is merged on the front or rear face of the card 52 and located centrally or slightly off-centre thereon.

In FIGS. 1, 3, 6 and 8 the inwardly-directed first part 51 of card 58 is smaller than the outwardly-directed second part 52 which carries the storage chip 59.

In FIGS. 2, 4, 5 and 7 the inwardly-directed first part 51 of the card which carries the storage chip 59 is larger than the outwardly-directed second part 52.

In the embodiments of FIGS. 9 to 16, the card 58 comprises an extension or tab 53 on one of its edges that protrudes from its first or second part 51,52.

In FIGS. 10, 12, 13 and 15, the extension or tab 53 extends from the card's first part 51 and overlays an adjacent section of the paper portion 10 in the flat position, i.e. it points inwardly of the document.

In FIGS. 9, 11, 14 and 16, the extension or tab of the card 58 extends from the card's second part 52 and protrudes beyond and in extension of the paper portion 10 in the flat position, i.e it points outwardly of the document.

The card 58 is made of plastic, or a layered composite material such as paper/plastic. The pliable paper portion 10 is generally rectangular and, in the embodiments of FIGS. 1, 2, 5 and 6, comprises a detachable end section 11 remote from the edge 15 to which the card 58 is attached, divided by a perforation line 12. FIGS. 3, 4, 7, 8 and 11 illustrate embodiments where the paper portion 10 is imperforated.

The card 58 is attached to the paper portion 10 by gluing, lamination and/or bonding. The paper portion 10 can be extended by an integral thin layer indicated in dotted lines which is merged with, laminated into or bonded to one face of the card's second part 52.

In the embodiments of FIGS. 17 to 24, a magnetized strip 62 is merged on the front or rear face of the card 58 adjacent its long edge.

Figure 19:
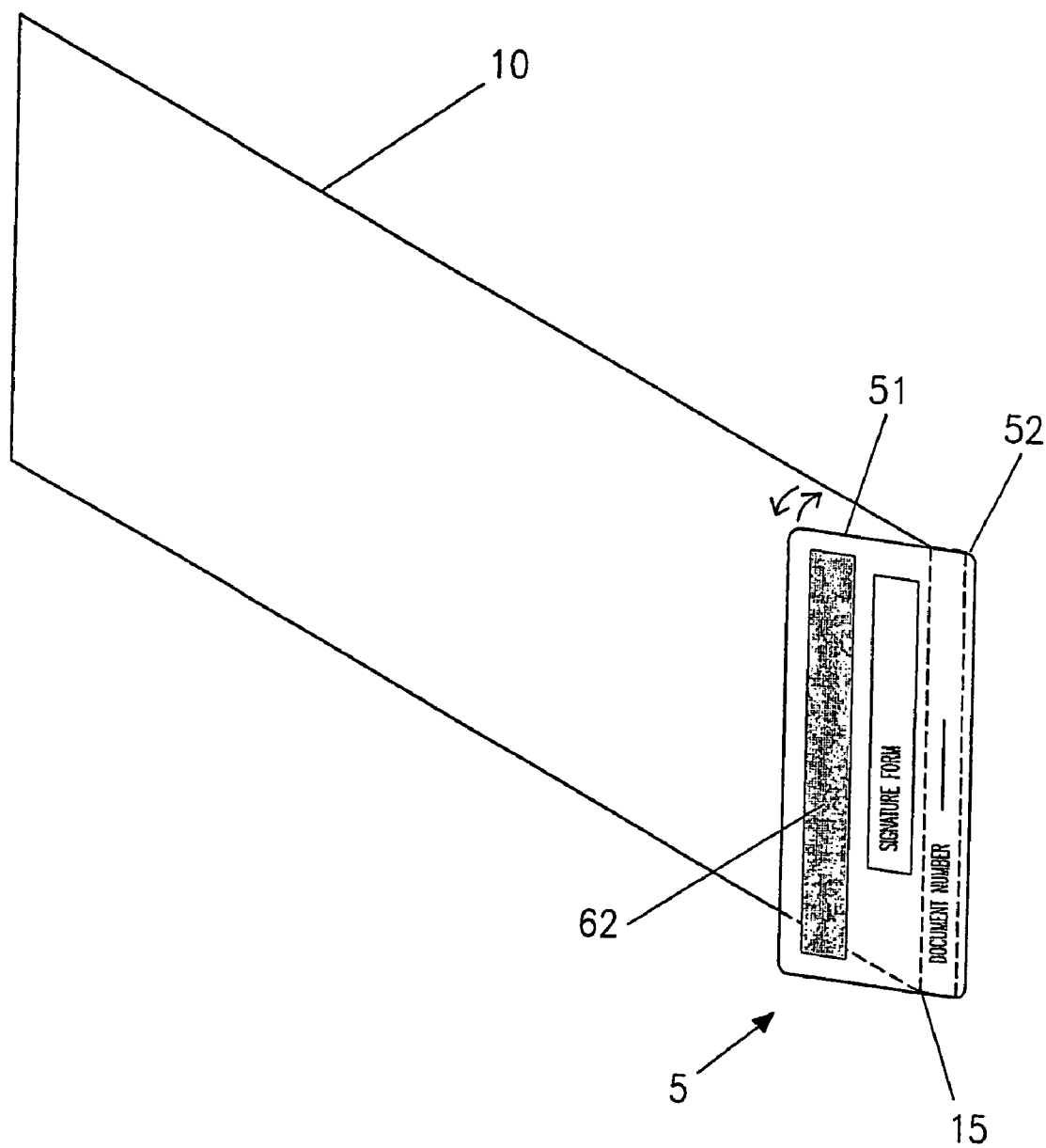
Figure 20:
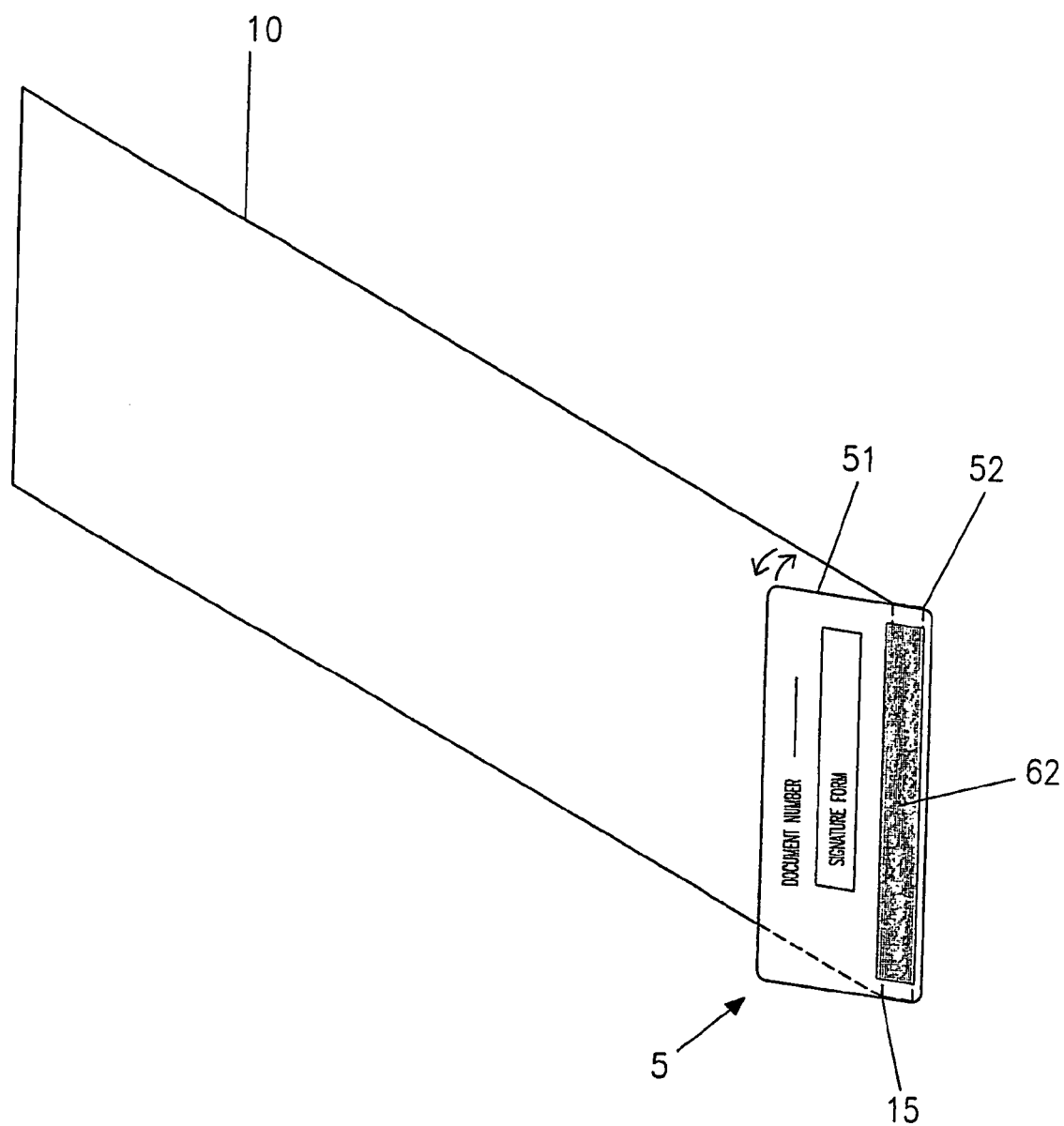
Figure 21:
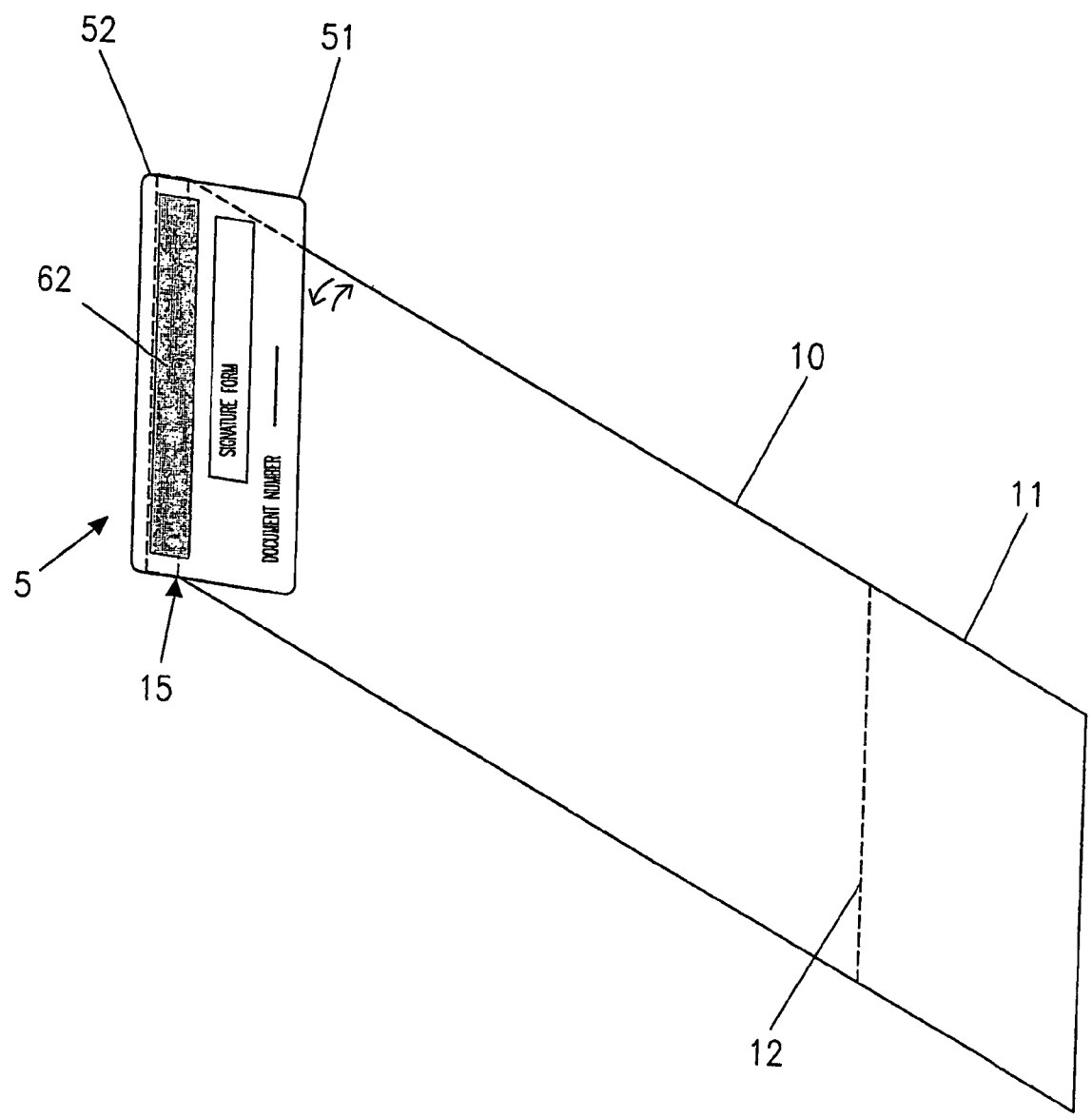
Figure 22:
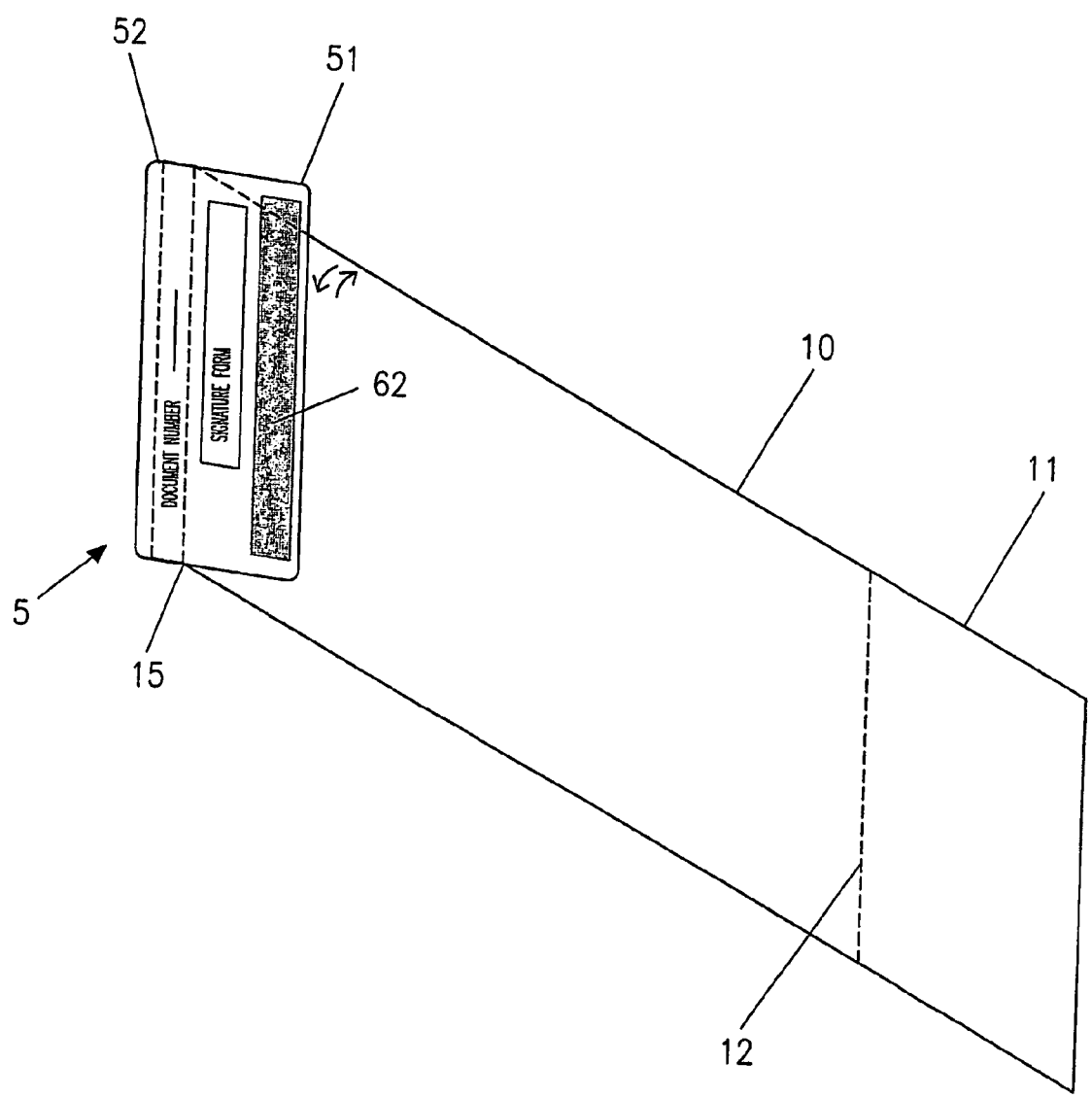
Figure 23:
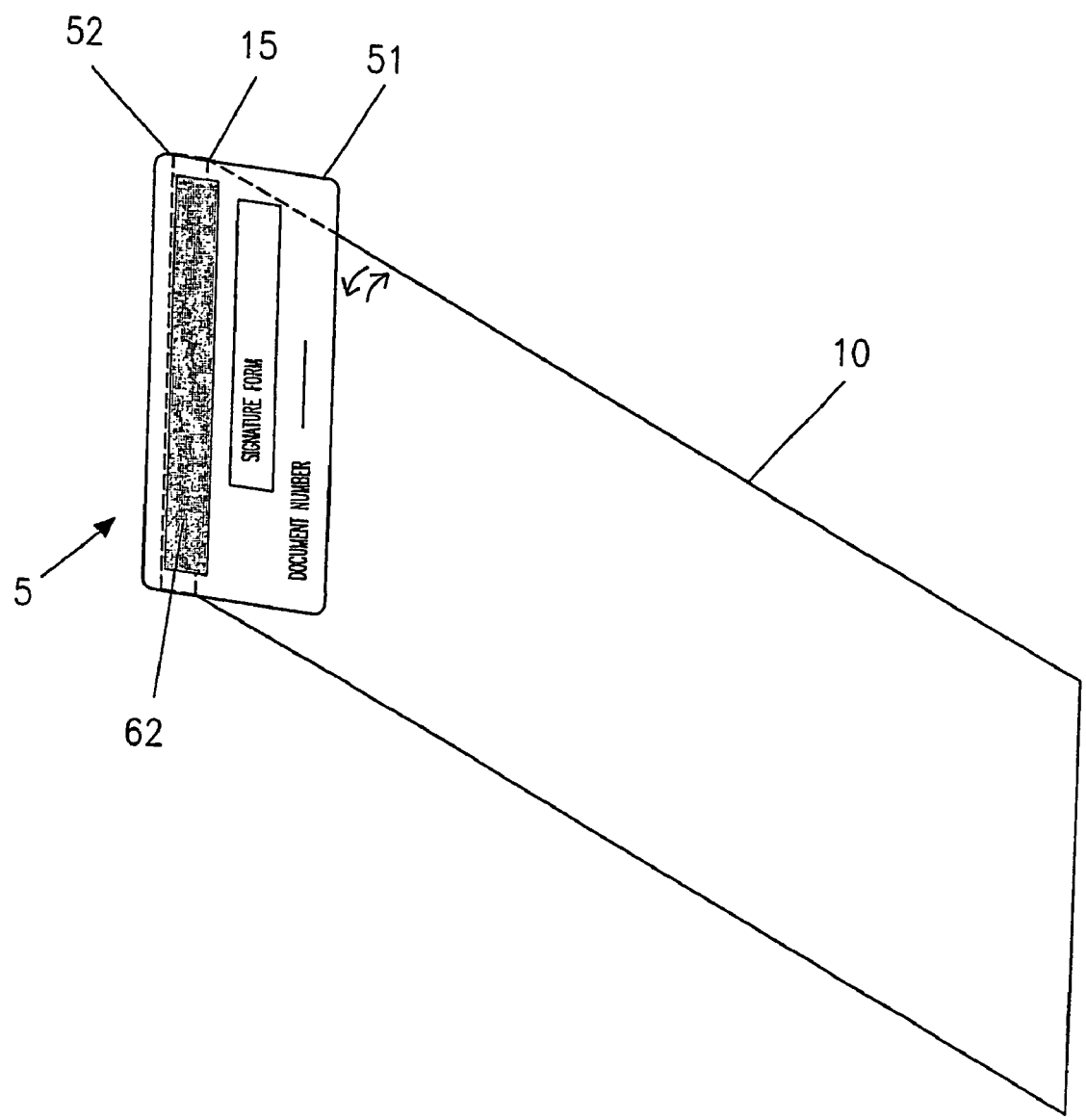
Figure 24:
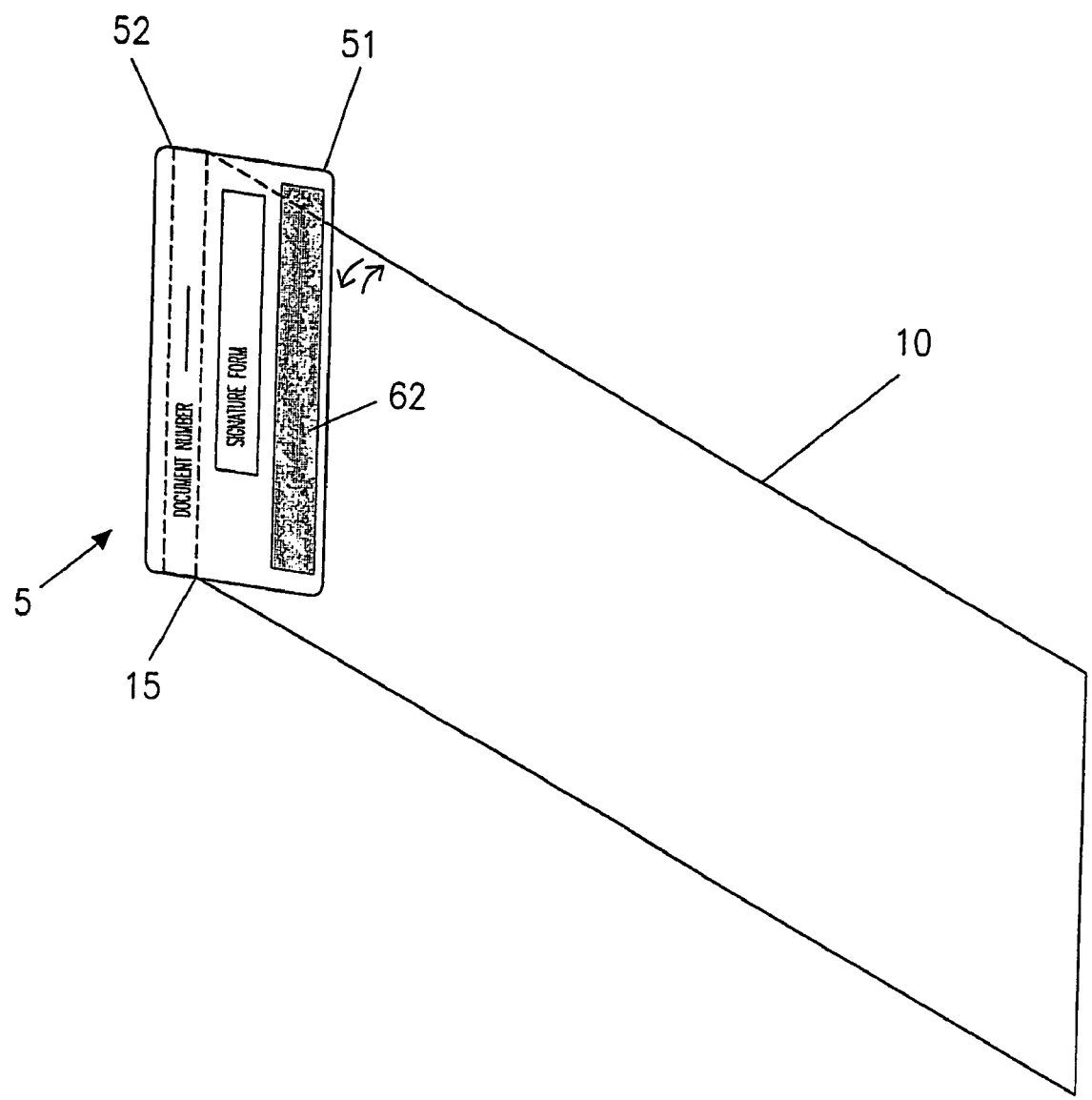
Figure 25:
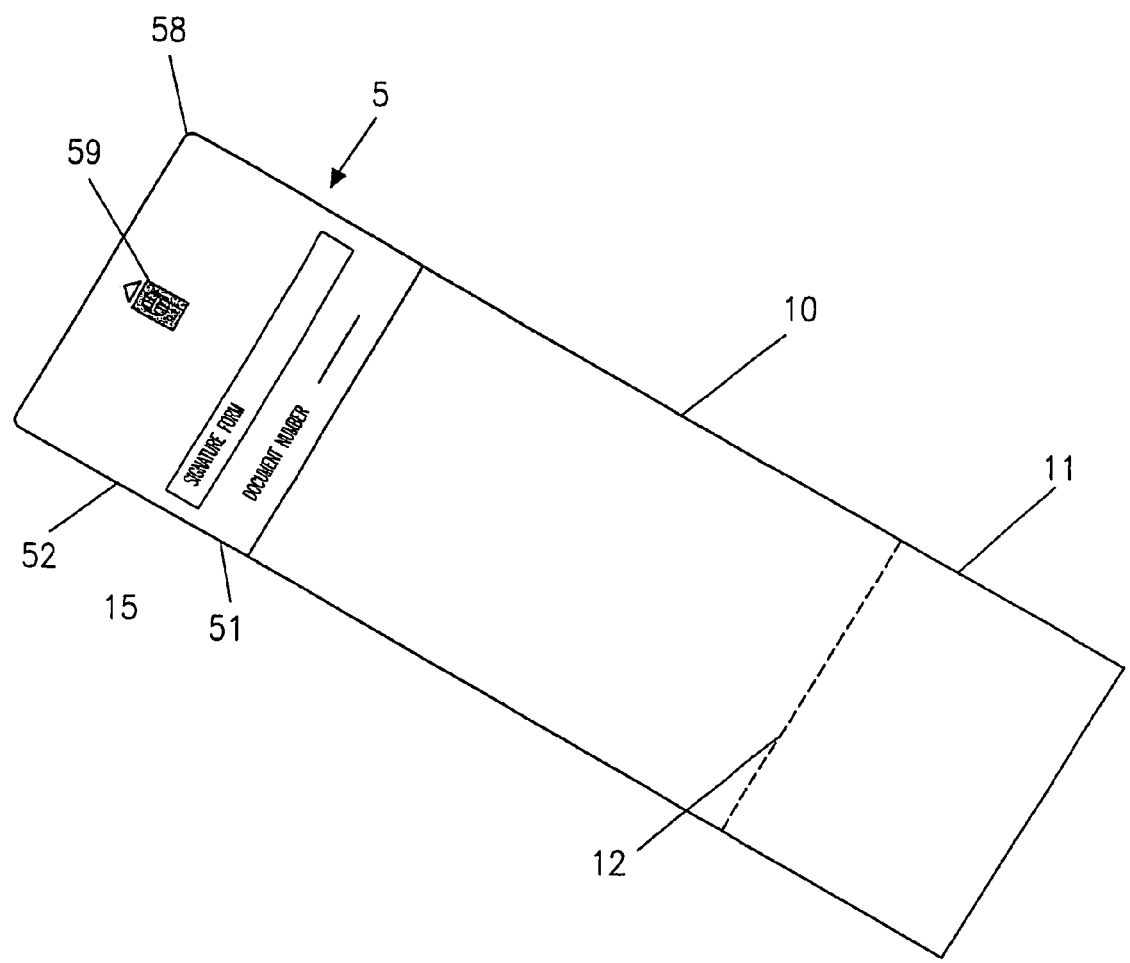
FIGS. 25 to 36 are front views of several of these Smart Documents, shown with the thick portion flat against the pliable thin portion.
Figure 26:
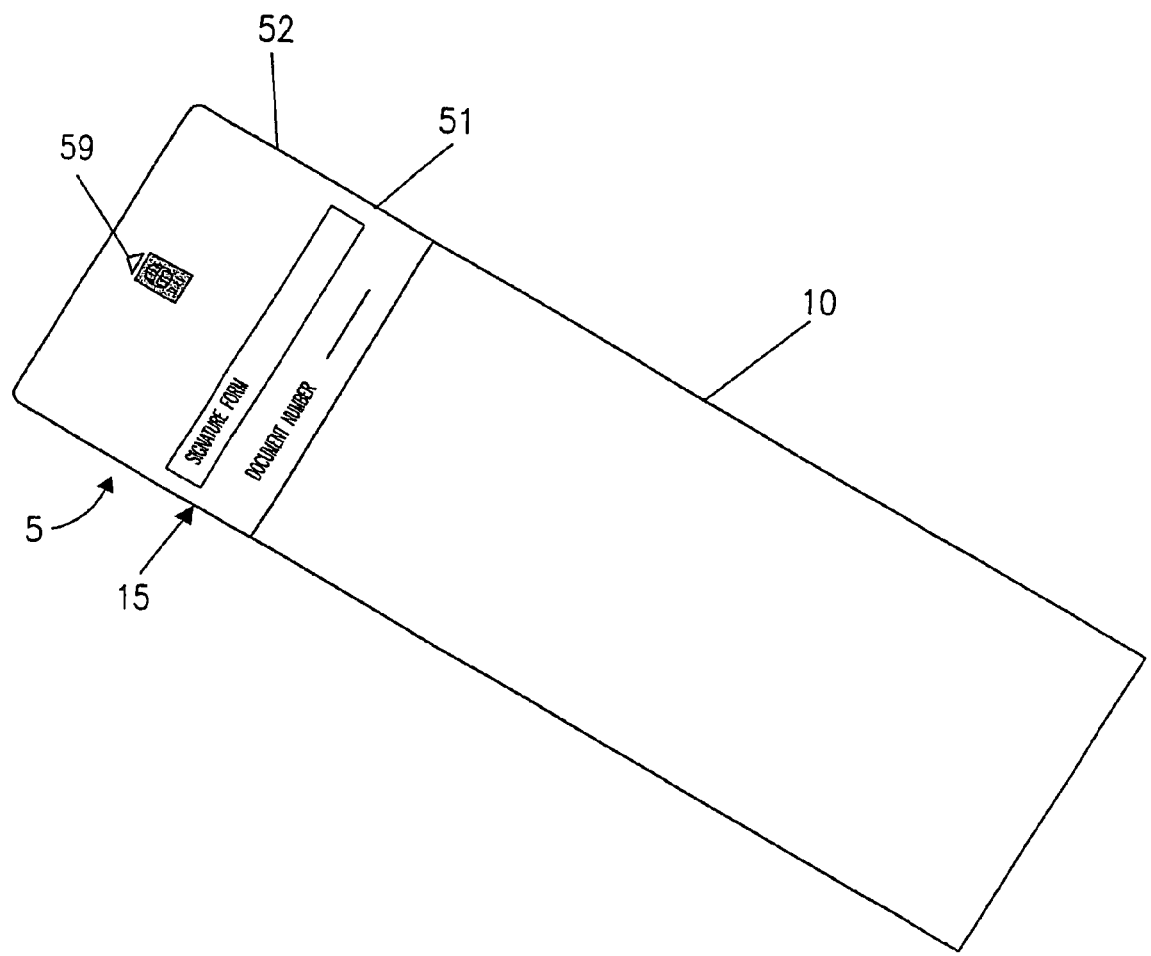
Figure 27:
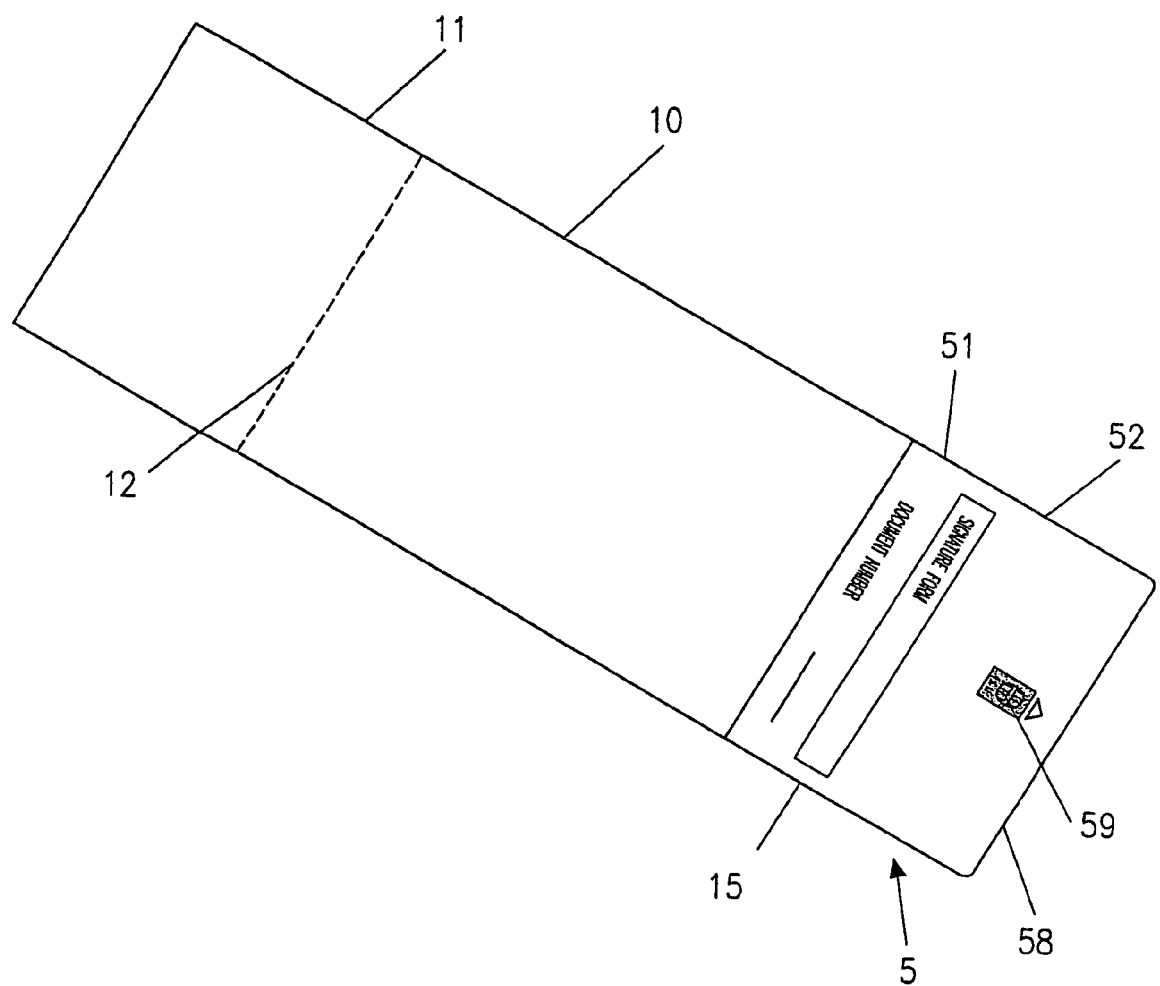
Figure 28:
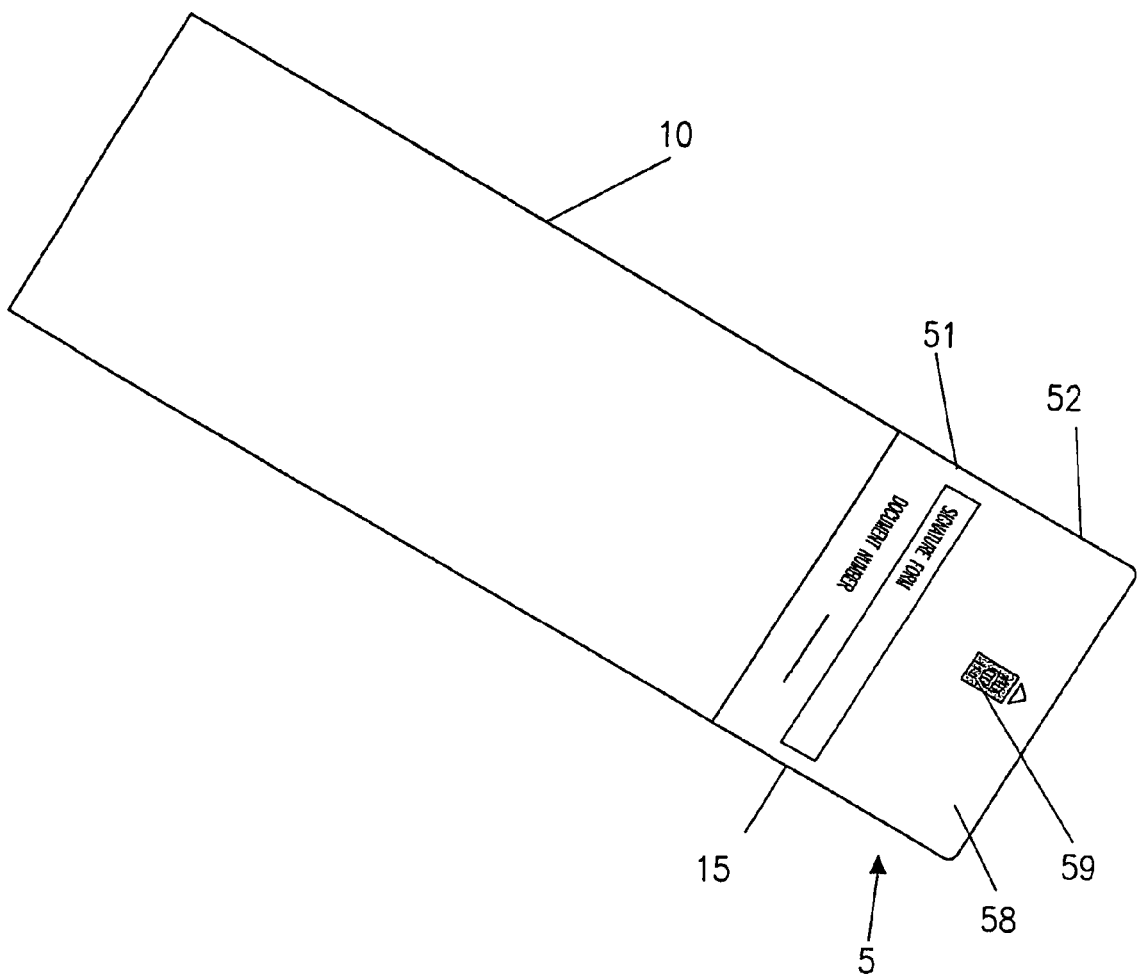
Figure 29:
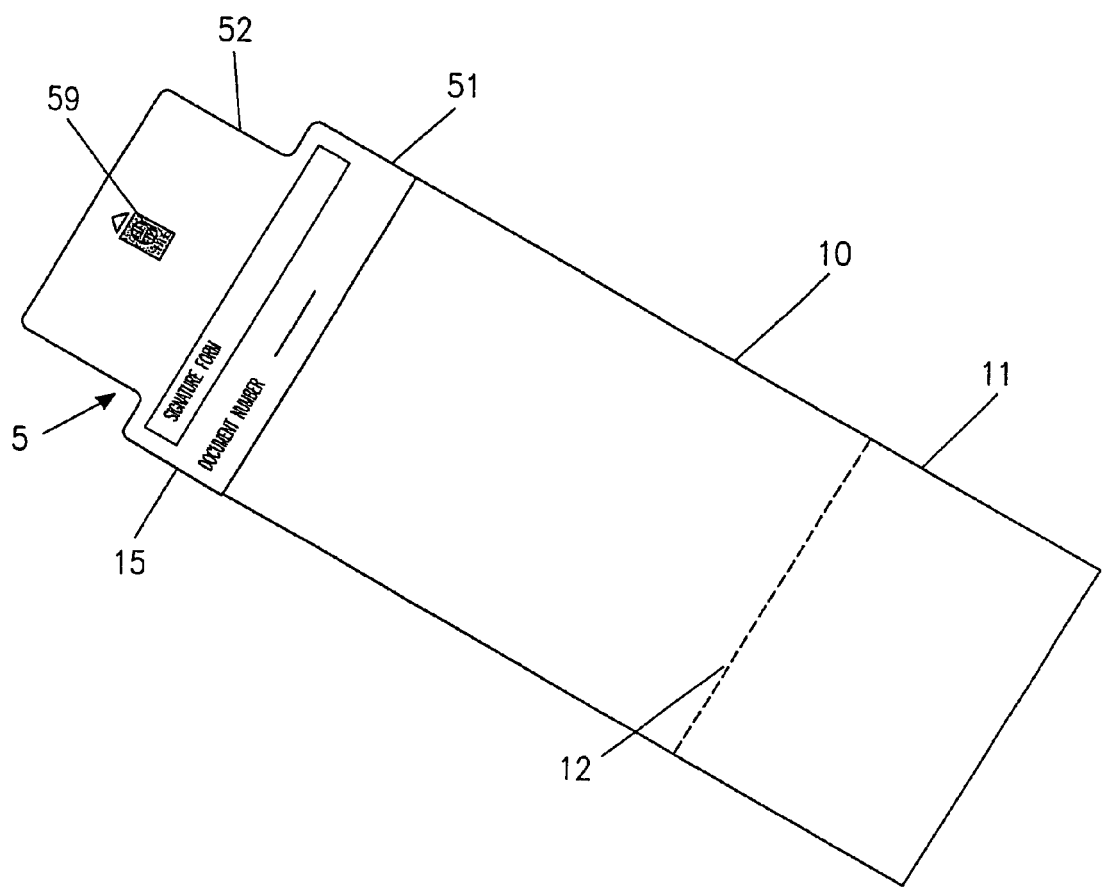
Figure 30:
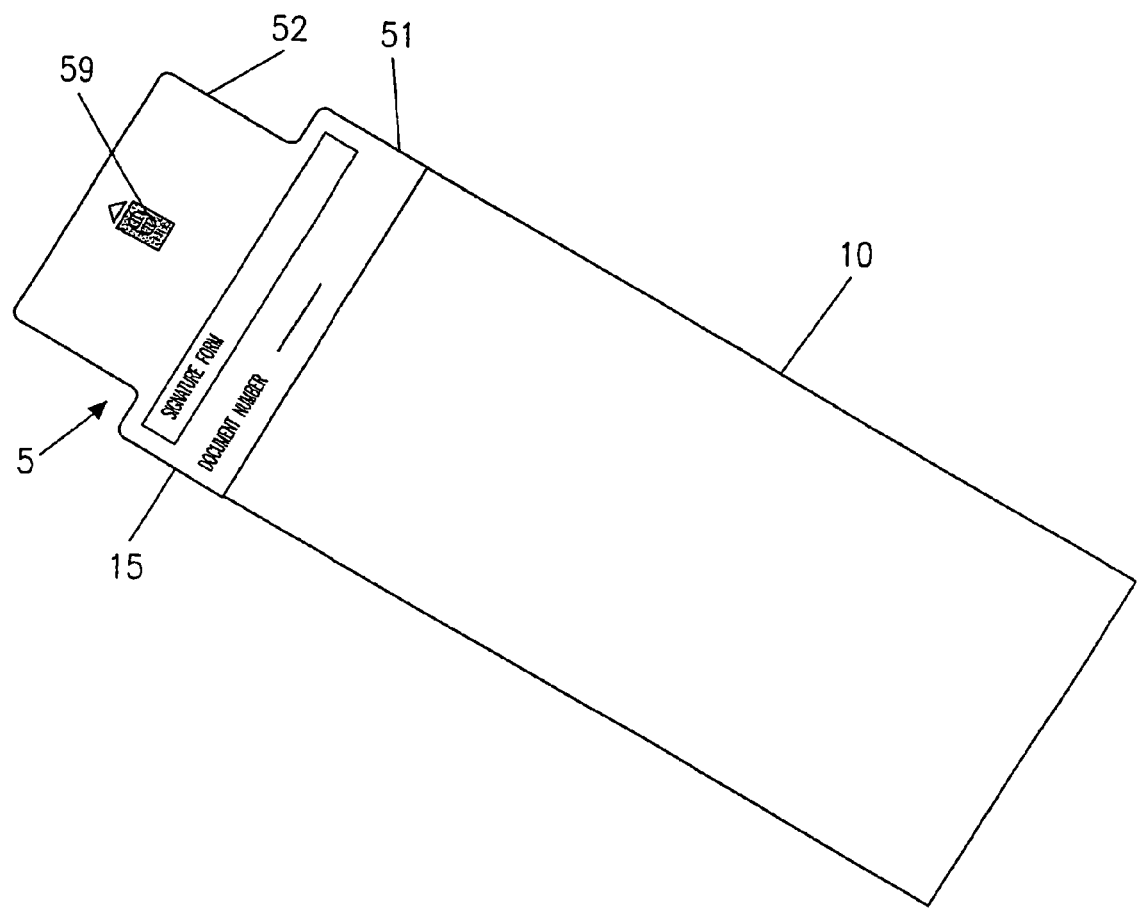
Figure 31:
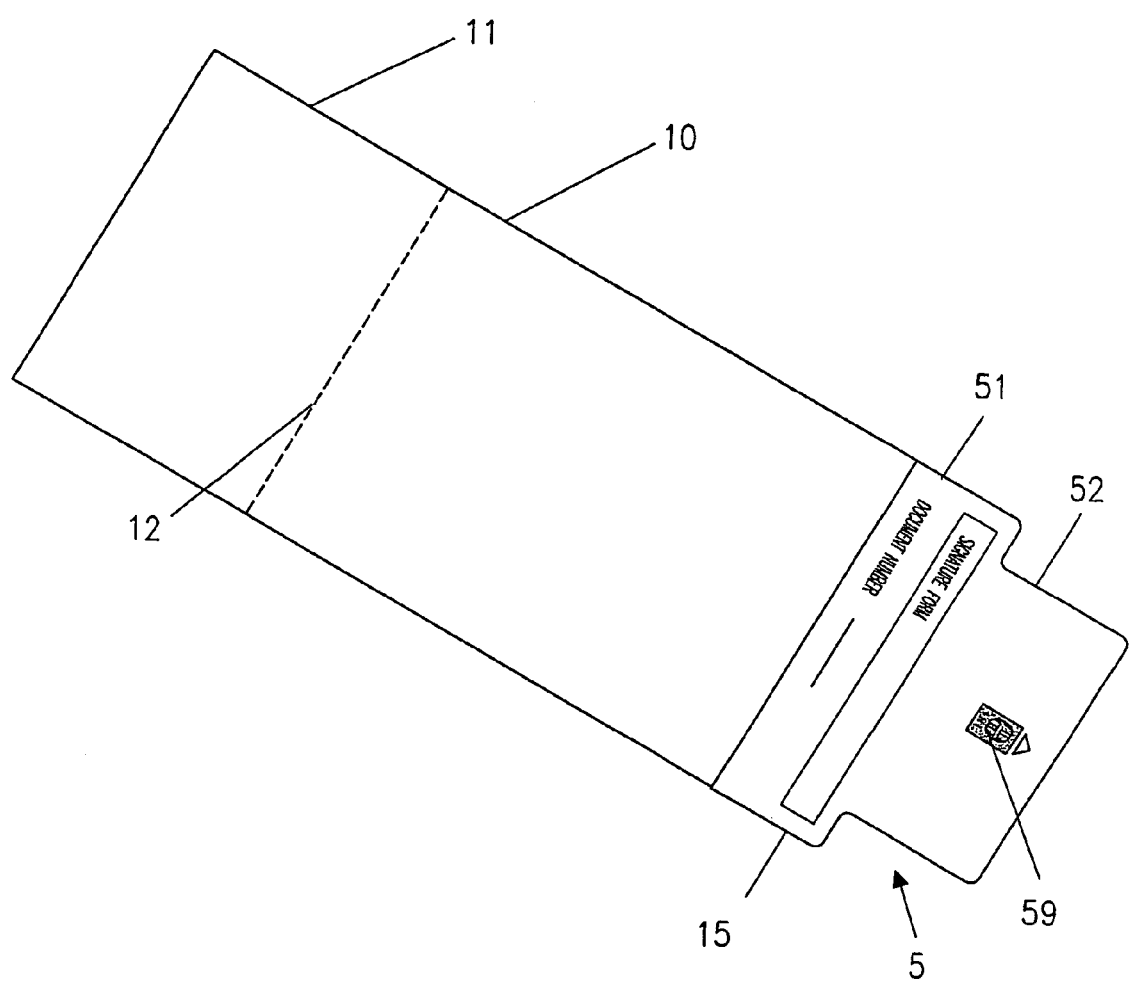
Figure 32:
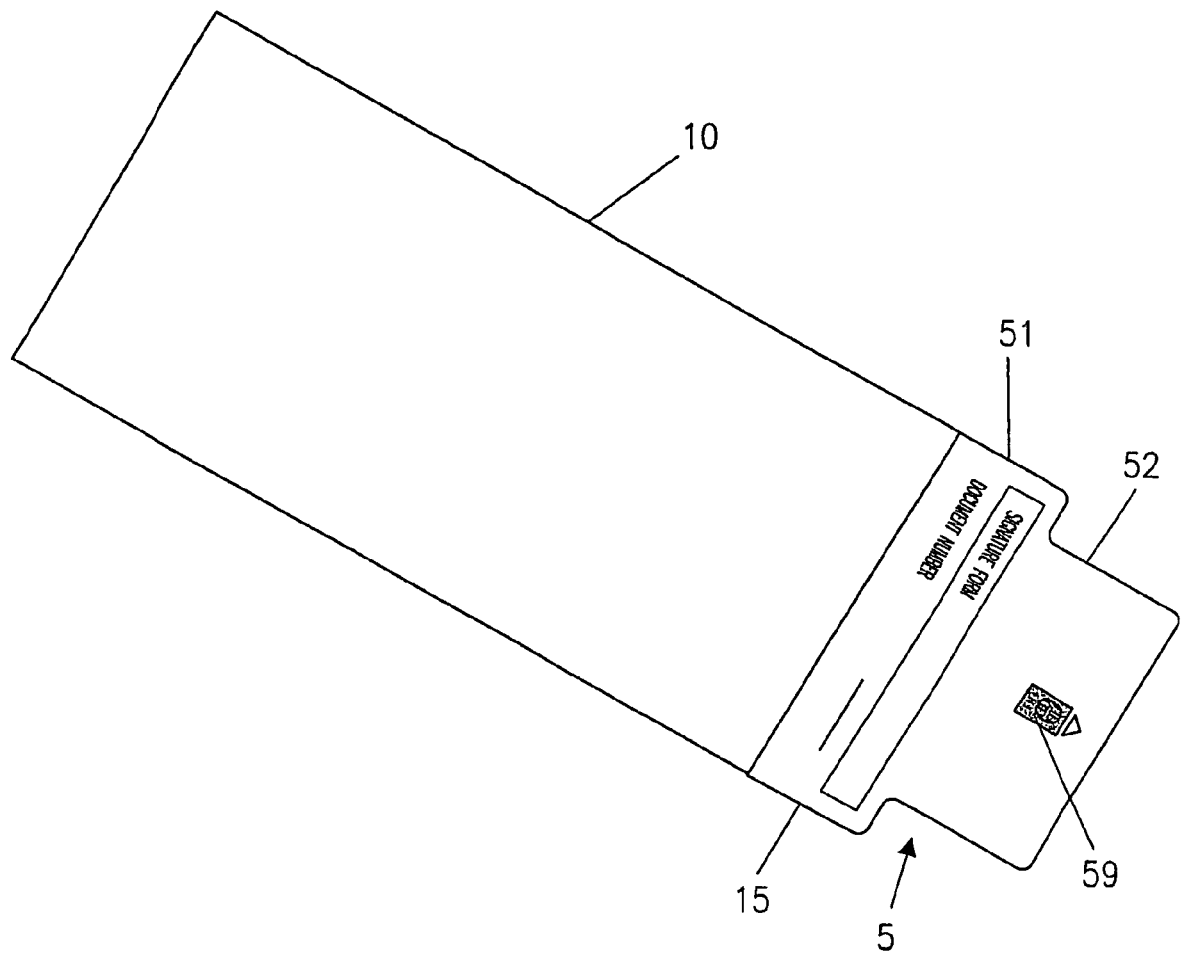
Figure 33:
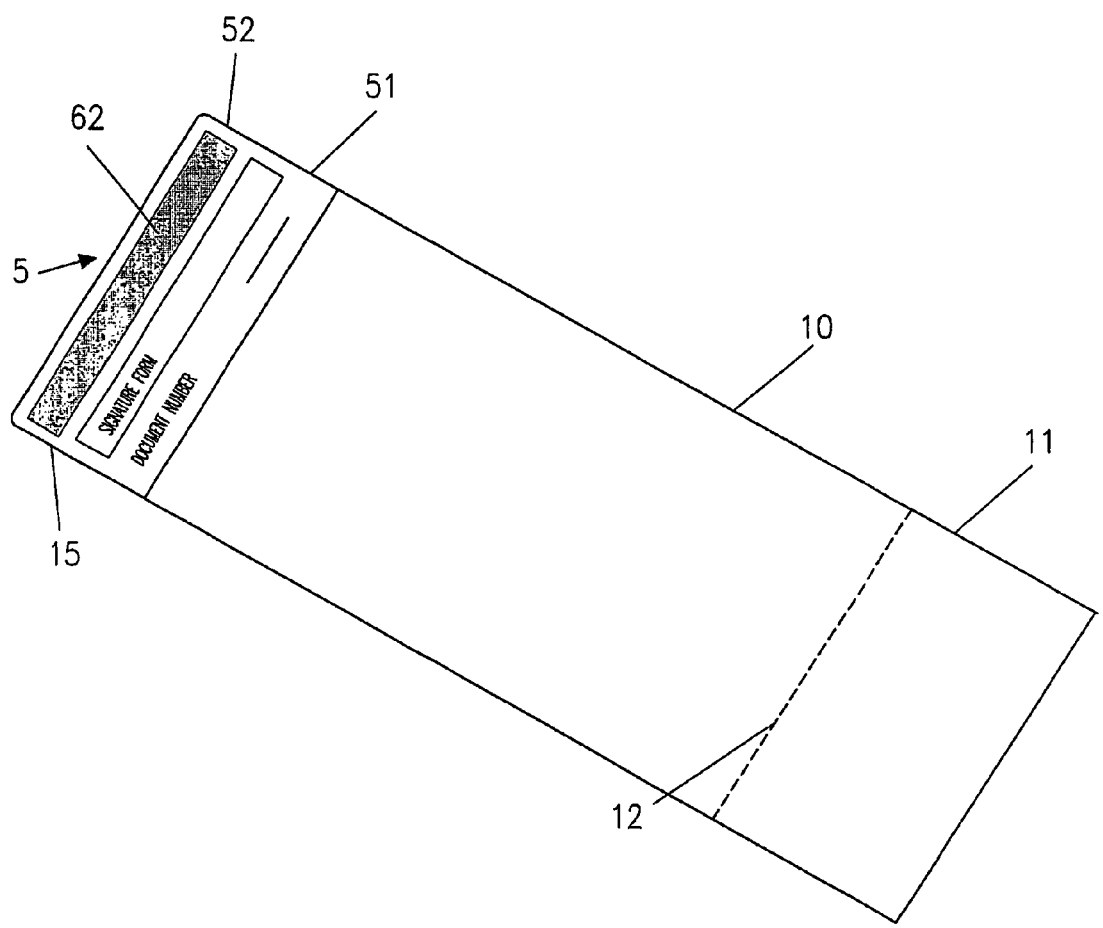
Figure 34:
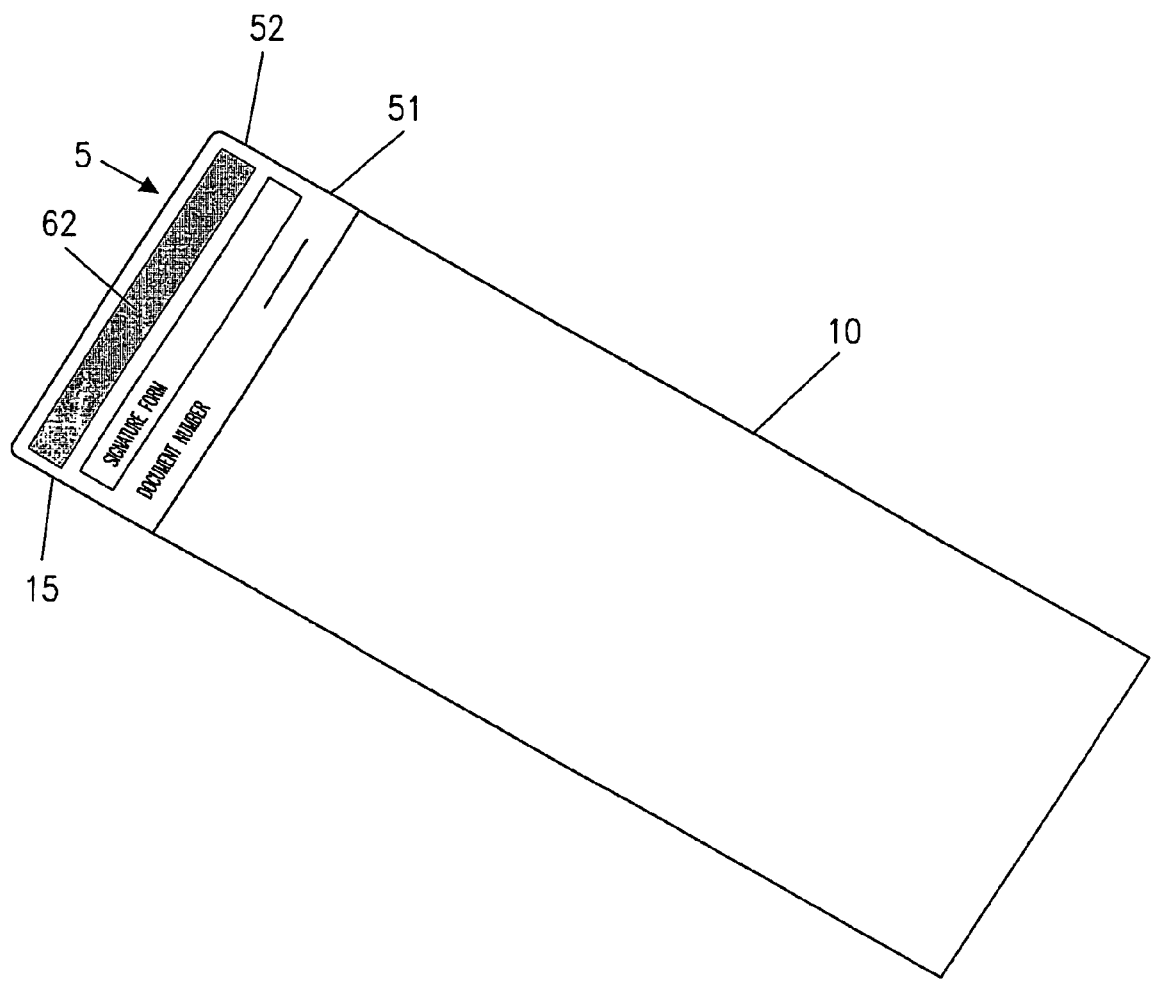
Figure 35:
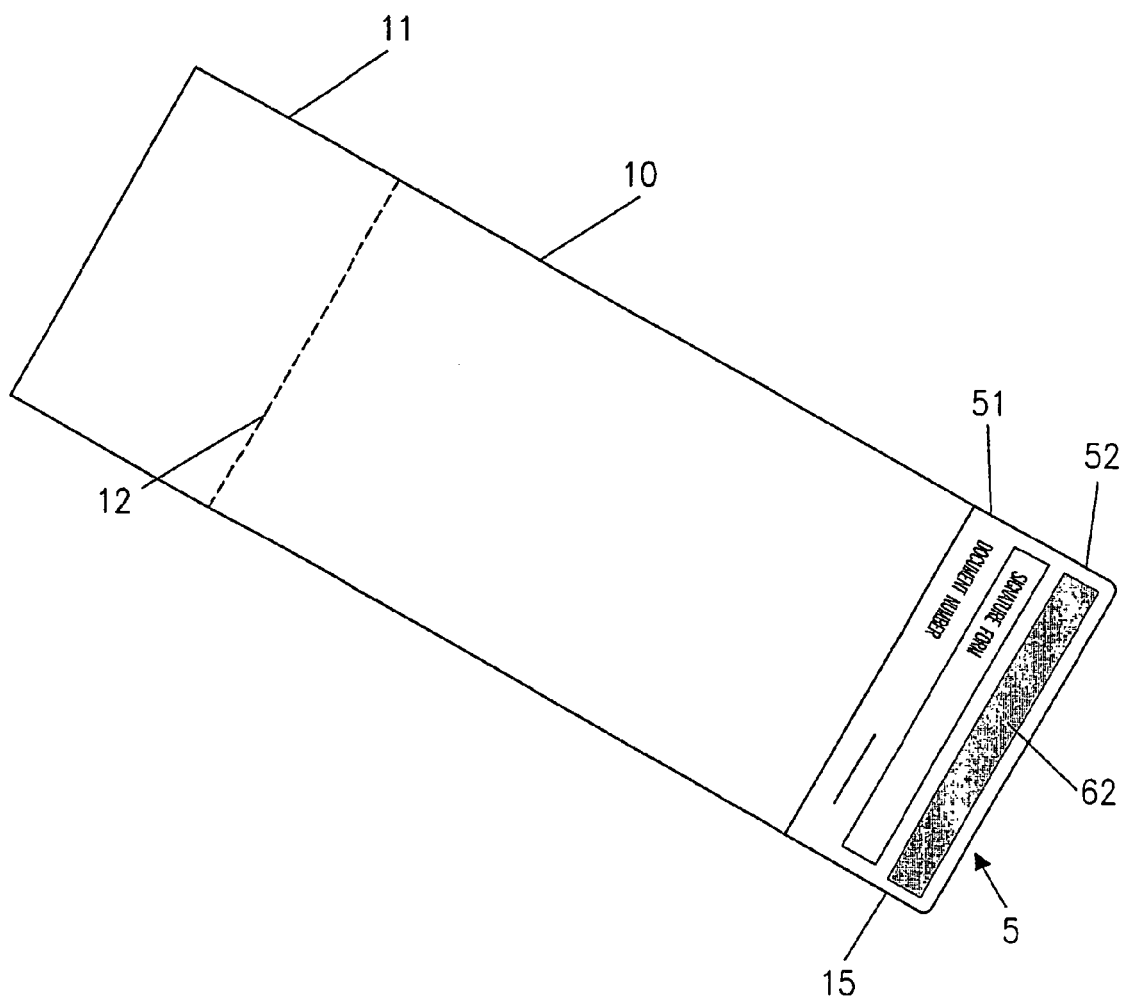
Figure 36:
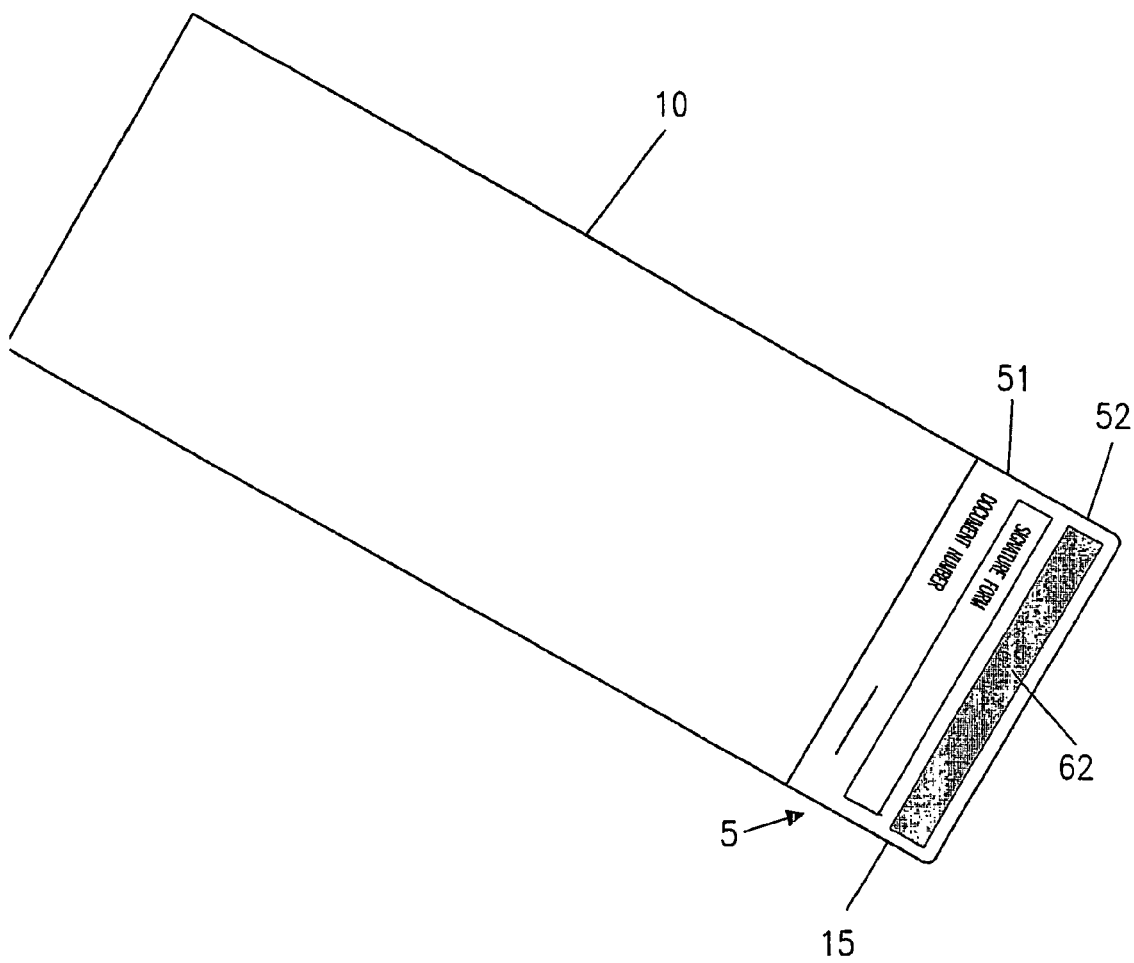

In FIGS. 17, 19, 22, and 24, the magnetized strip 62 is on the card's first part 51, overlying or pointing towards the paper portion 10. In FIGS. 18, 20, 21 and 23, the magnetized strip 62 is on the card's second part 52 pointing away from the paper portion 10. In all these embodiments, the connecting edge 15 is close to the outer edge of the card 52. As before, some of these embodiments have a detachable paper section 11 divided by a perforation 12, as in FIGS. 17, 18, 21 and 22, whereas the others do not (FIGS. 19, 20, 23).

It can be seen that in all the embodiments of FIGS. 1 to 24, a magnetized strip 62 or storage chip 59 is merged in one of the first and second parts 51 or 52 of card 58, and the other of the first and second parts 52,51 of card 58 is accessible to be gripped by the user's fingers for passing the free edge of the card 58 with the magnetized strip 62 and/or storage chip 58 through a reader when the card 58 is inclined to the paper portion 10 which folds to accommodate for the inclination of the card 58.

The chosen configuration for the card 52 and the magnetized strip 62 or storage chip 59 will depend on the end use and the reader's specifications.

The Method of Writing and Reading the Storage Chip

Figure 37:
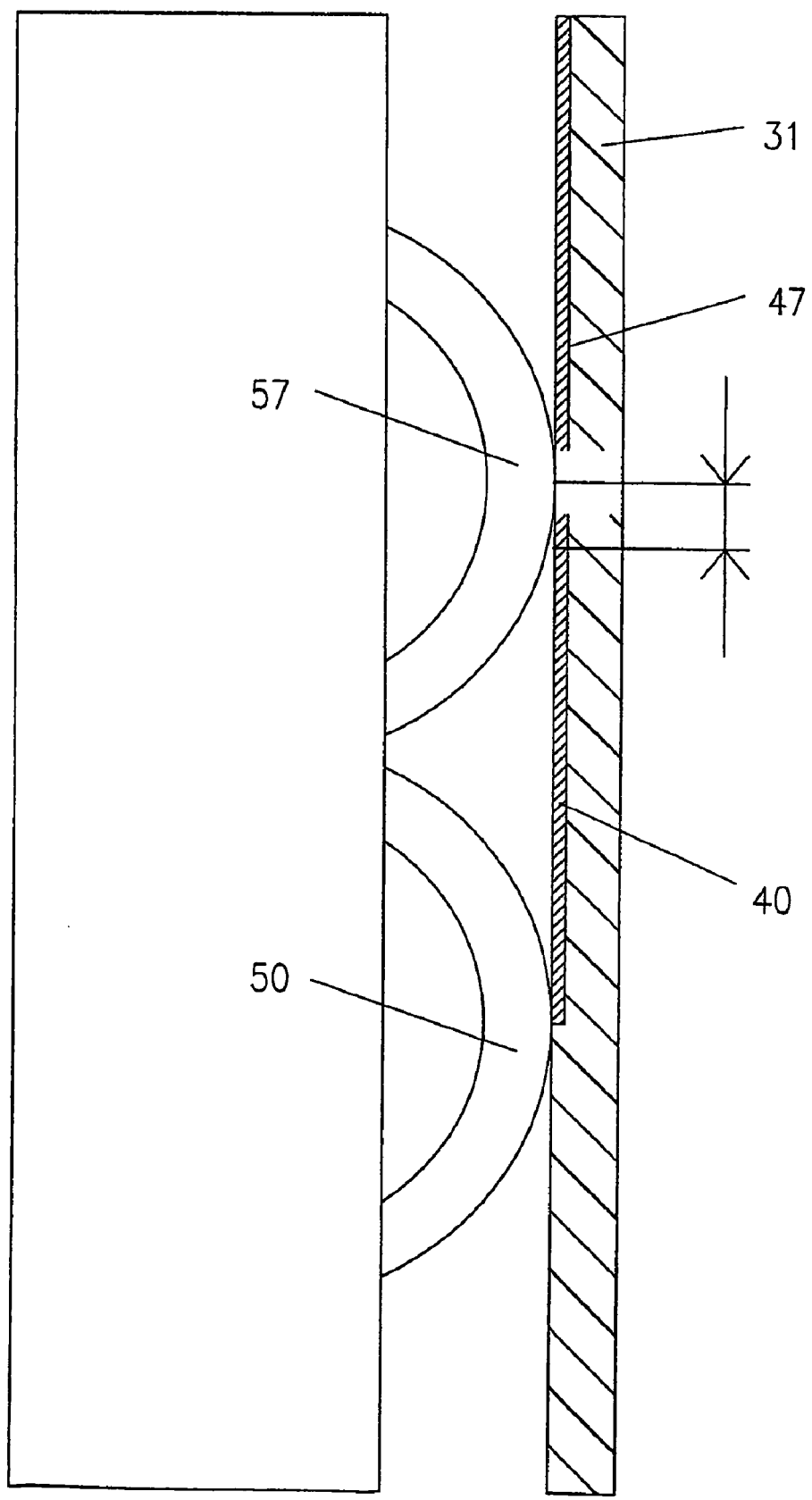
FIG. 37 illustrates the method of reading and writing the storage chips in general.

FIGS. 37, 38-A and 38-B illustrate the principle of a method for writing and reading stored encoded data in the storage chip in general, as is known from U.S. Pat. No. 6,112,997. In these Figures, reference numeral 31 indicates a plastic Smart Document with a microchip module 33. On the surface of the plastic chip, in the region of the microchip modules 33, eight contacts 40,41,42,43,44,45,46,47 are mounted and connected electrically conductively to the microchip. They serve to provide electrical contact with eight corresponding fixed counter contacts 50,57 of a plastic Smart Documents reader that has a slot for receiving the Smart Documents 31. In FIGS. 38-A and 38-B the electrical contacting of the first and eighth contacts 40 and 47 of the Smart Documents 31 with the first and eighth counter contacts 50 and 57 of the plastic Smart Documents reader is shown. The counter contacts 50, 57 are electrically conductively connected to a microprocessor 60 of the reader. The contacts 40,47 on the surface of the Smart Documents 31 are arranged such that two contacts each in the insertion direction, indicated by an arrow, and four contacts each crosswise to the insertion direction are disposed side by side. In FIGS. 38-A and 38-B, the Smart Documents 31 is introduced lengthwise into the Smart Documents slot of the Smart Documents reader. However, it is also conceivable for the Smart Documents 31 to be introduced widthwise into a corresponding Smart Documents slot. In that case, the arrangement of the contacts 40, 47 on the surface of the Smart Documents 31 would have to be rotated by 90 Degree from what is shown in FIGS. 38-A and 38-B. It does not matter hereinafter whether the Smart Documents 31 is to be introduced into a slot lengthwise or widthwise, since the disposition of the contacts 40,47 in the insertion direction is always the same. By means of the electric contacting of the contacts 40,47 with the corresponding counter contacts 50,57, writing and/or reading operations on the microchip of the Smart Documents 31 are possible with the aid of the microprocessor 60.

FIG. 38-C illustrates an embodiment of a reader with two paths for reading magnetized strips and storage chips, as described below. The new Smart Documents can however be used with any other suitable reading/writing devices.

FIG. 38-C is a perspective view of a reader 61A for the Smart Documents. Currently, there are available on the market devices which can read magnetic strips the electronic storage chips possibly through passages and openings 65A, 66A as per the illustration of FIG. 38-C. The reader 61A also has a keypad 62A, a display 63A and a print-out 64A. These device and others can be used to read a Smart Documents equipped with magnetic strips only as in FIGS. 17 to 24 or equipped with storage chips only as per the FIGS. 1 to 16, or Boarding Passes equipped with a magnetic strip and a storage chip on condition that the Boarding Pass shall be adapted to the reading devices and both shall be as per the standard specifications. The type of reader shown in FIG. 38-C can be portable or fixed and could for instance be used for reading the Smart Documents at a bank or point of sale or transit or access; the same or different designs of readers could be used at baggage check-in, passenger embarkation and other points of transit, when such uses are previewed. Preferably the device will be a combined reading/writing device.

Further Embodiments

Figure 39:
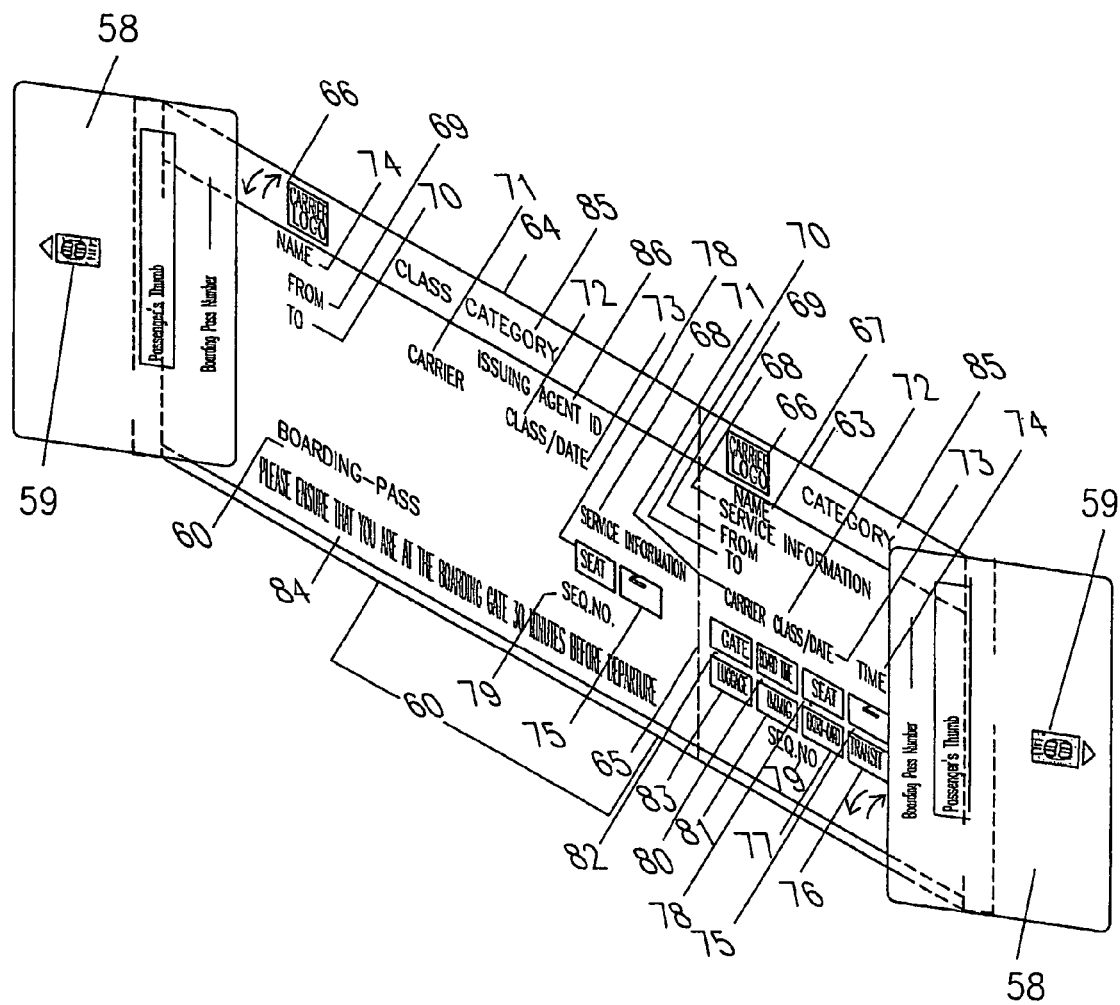
FIGS. 39 and 40 are schematic front perspective views of further embodiments of Smart Documents according to the invention having two thick portions inclinably mounted on opposite ends thereof.
Figure 40:
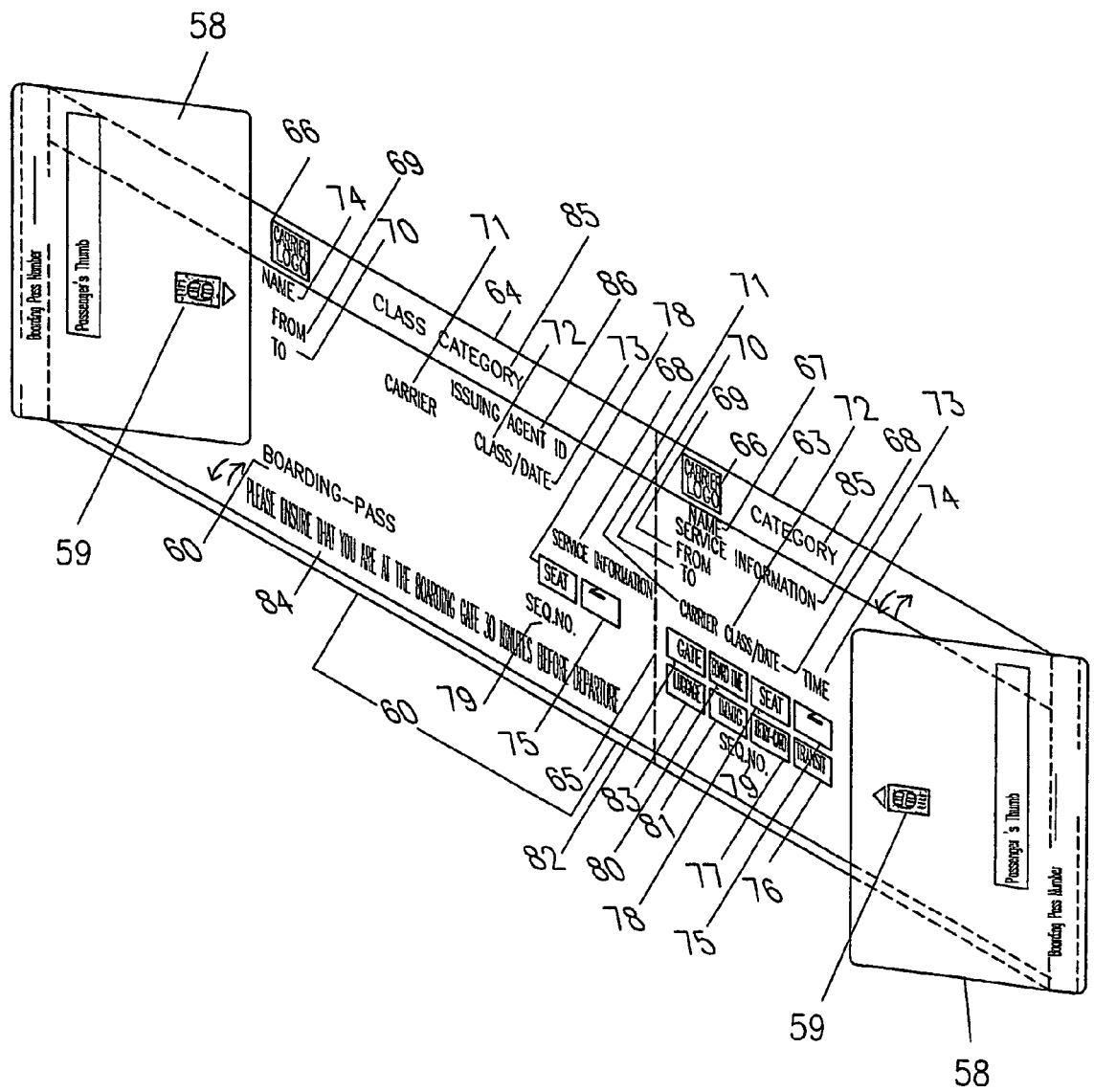

The embodiments of the Smart Document shown in FIGS. 39 and 40 each have a plurality of planar cards 58 inclinably attached to different parts of the paper portion each card including a magnetic strip and/or storage chip, namely two planar cards 58 inclinably mounted at opposite ends of the paper portion.

The Boarding Pass 60 illustrated in FIGS. 39 and 40 consists of two parts, a passenger coupon part 63 and a main coupon part 64. The Boarding Pass 60 is generally rectangular and made from special paper suitable for writing/printing. On its opposite narrow edges it has two thick card portions 58 made of plastic or any other material each with a merged storage chip 59 or a magnetized strip (not shown). As shown, these thick portions 58 are situated on the right side of the passenger coupon part 63 and the left side of the main coupon part 64. The thick portions 58 are for example generally rectangular and are inclinably attached to the thin paper portion of the Boarding Pass.

The storage chips 59 fixed on the thick plastic card portions 58 carry the required magnetized information stored in the Boarding Pass; also it is possible to load entry card information thereon.

A perforated line 65 divides the main and passenger coupon parts of the Boarding Pass, illustrating the possibility to fix the storage chip on the thick card portion 58 from the front and rear sides. If required, the storage chips are on one side only.

As shown in FIGS. 39 and 40, the front face of the Boarding Pass 60 carries printed indications and has corresponding spaces for printing data. The printing/data on the front face includes, at appropriate locations and where appropriate duplicated on the passenger coupon part 63 and on the main coupon part 64: a carrier logo 66; the passenger name 67; service information 68; the departure airport 69; the arrival airport 70; the carrier (airline company/flight number) 71; the travel class 72; the departure date 73; the scheduled departure time 74; smoking or non-smoking passenger 75; transit details 76; entry card requirements 77; seat 78; serial number 79; the boarding time 80; security counter 81 for immigration and passport data; the departure gate number 82; luggage information 83; a notice 84 to inform the passengers to be at the departure gate 30 minutes before departure; an indication of the class/category 85; and the issuing agency 86. Corresponding data is encoded and stored in the storage chips 59 or magnetized strips.

As shown, part of this information is pre-printed on the front face of the Boarding Card that has spaces for printing further data, in particular data printed in correspondence with encoded data stored in the storage chips 59 (or magnetized strips). The printed information appears on the thin portion of the Boarding Card 60. The thick card portions 58 in principle have no printed information, or only permanent printing (like a logo), but normally not data that is printed in correspondence with the encoded data.

The above-mentioned information is given as example and is not exhaustive. It is possible to add any necessary data for the passenger, security, airlines companies, and service companies relating to airlines industry, and by using the insurance number of the passenger, all such information could be printed on and/or be readable from the Boarding Pass, stored into the magnetized strip and/or storage chip merged into the Boarding Pass.

FIG. 39 illustrates a Boarding Card 60 having generally rectangular thick portions 58 that are inclinably attached to the opposite ends of the Boarding Card 60, one inclinable thick portion 58 is attached to the passenger coupon part 63 and the other inclinable thick portion 58 is attached to the main coupon part 64. In FIG. 39, the storage chips 59 are on the parts of the thick portions 58 that protrude from the ends of the Boarding Pass 60 when the thick portions 58 lay flat against the Boarding Pass or are slightly inclined, as illustrated. In this way, the storage chips 59 on the protruding parts can easily be engaged with reading/writing devices, the user gripping the other, inner edge of the thick card portion 58.

FIG. 40 illustrates another Boarding Pass 60 that has inclinable thick card portions 58, like in FIG. 39, but in this case the storage chips 59 are on the parts of the thick portions 58 that lie over the Boarding Pass 60, or point inwards, when the thick portions 58 lay flat against the Boarding Pass 60 or are slightly inclined, as shown. To insert the storage chips 59 of this Boarding Pass 60 into a reading/writing device, the user grips the narrow outer edge of the respective thick portion 58, inclines it relative to the Boarding Pass 60, and places the part of the thick portion 58 with the storage chip 59 in the reading/writing device.

As illustrated in FIGS. 39 and 40, such inclinable thick portions can be attached to the ends of the passenger coupon part 63 and the main coupon part 64 at different points of attachment allowing different possibilities for inclining the thick portions. Also, the generally rectangular inclinable thick portions of FIGS. 39 and 40 could be replaced by "winged" shapes, for example as shown in FIGS. 9 to 16, or other shapes.

The storage chip can include a microprocessor for carrying out operations relative to managing a passenger's account for purchase operations, or for automatic clearance in case a passenger changes airline company, or any other operations.

The thick card portion can be configured to perform as a key for hotel room doors (like in the aforementioned GB 2351 379-A), or for access to hotel floors, or for allowing access to other places.

Further Features of the Smart Documents System

The following is a detailed description of elements and features of the Smart Documents system and its communications system, constituting the technical means for implementing same, taking into consideration the overall context of the invention. The implementing elements include:

(1) A Mid-Range Server, on which the main database is stored, and pertaining to the various transactions that will be executed among the various companies, organizations, and all authorities participating in the system, to execute the operation of the required writing and reading the Smart Documents, execute, and the financial settlement between these companies.

(2) A Relational Database Management System (RDBMS) containing all the particulars and data pertaining to the Smart Documents, together with the transactions to be executed, the participating companies, organization codes, the reader units and others.

(3) Communication Devices, through which connection will be made between the aforementioned Mid-Range Server and the below-mentioned sub-servers, using various types of communications, including Dial-Up, Leased Line, ISDN, etc.

(4) Fire Walls, though which monitoring and controlling all the communications with the Mid-Range Server will be made, eliminating any unauthorized entry.

(5) The above-mentioned elements will be available, and will be installed within a Main Processing Center pertaining to the authority in charge of the new Smart Documents system according to the invention, for carrying out all transactions pertaining to it.

(6) A sub-Server, which is a computer which will be installed with every one of the organization, authority, company participating and subscribing to the service of the Smart Documents system of the invention, on which the data and particulars pertaining to the subscribers will be stored, together with the numbers of the new Smart Documents issued by the companies and the same will be associated with the accounts of the dealers, etc.

(7) Sub-Relational Database Management Systems (RDBMS): theses bases will contain such data and particulars mentioned in (6), each confined in the dealers of the particular company, organizaiton only.

(8) Sub-Communication Devices through which connection between the server mentioned in (6), and the reader systems and processing systems mentioned hereunder, together with the sub-server mentioned in (6), will be made.

(9) Sub-Fire Walls, namely systems for protecting, monitoring and controlling the entries made to the systems mentioned in (6).

(10) The elements from (6) to (9) above will be installed with every company, organization, authority that participates and subscribes to the services of the Smart Documents system of the invention.

(11) Smart Documents reader/writer systems, namely units and systems that will be installed with the various parties that handle and make transactions with the new Smart Documents.

(12) The above-mentioned reader/writer systems will be connected with the sub-server mentioned in (6), through communication systems that allow the above-listed types of connection.

(13) The reader/writer systems will contain a reader/writer for the magnetic strip and/or stored chip integrated in the Smart Documents, together with a keyboard, through which the data and particulars pertaining to the transactions to be executed will be entered, as specified herein.

(14) The reader/writer device should be equipped with a reader screen for thumbprints, to compare the thumb (print) of the dealer with the stored one on the magnetized strip or storage chip. These devices are in common use now, similar to devices for monitoring employee attendance through thumbprints.

(15) The new Smart Documents is a pass issued by an approved company, which is participant and subscriber of the services of the Smart Documents system of the invention, this Smart Documents being constituted of the paper or plastic or other material together with the integrated magnetized strip and/or stored chip.

(16) All the above-mentioned elements from (1) to (15) will be connected together, through an integrated communications network, as specified above.

Practical Application of the Invention

The practical implementation of the Smart Documents system according to the invention is illustrated by way of example in the following steps:

Step 1: The authorities, organizations, companies or individuals initially applies to the company, which is a participant and subscriber to the Smart Documents system, and provides the required information, and settles the required fare or fee, or where required funds the bank account.

Step 2: The Smart Document Services Authority then issues the required Smart Documents, in accordance with the data and information approved by it to achieve the target.

Step 3: The participant receives the new Smart Documents, issued in accordance with the data and information approved by the Smart Document Services Authority.

Step 4: The dealer shall scrutinize and check the particulars of the Smart Documents, to make sure that these have been duly completed and that there are no erasures.

Step 5: The dealer can then pass the new Smart Documents through the reader system, to make sure of its correctness, on the participant company, authority, organization, individuals to ensure the correctness of the Smart Documents specially for the number of the Smart Documents and the security stored elements, which confirmed many points, the most important is: non-duplication of the Smart Documents.

Step 6: The reader system will connect with the sub-server, to communicate the information and data pertaining to the Smart Documents, to make sure of its correctness.

Step 7: The sub-server will process the data received from the reader and pass it through the respective database, then it forwards a reply electronically as regards the correctness and soundness of the Smart Documents that were actually issued by the participant company of the system.

Step 8: In case of issuing the Smart Documents by another services company participating in the system, the transaction will be passed from the sub-server to the Mid-Range Server which contains an inclusive database containing all the particulars of all Smart Documents issued by all services companies participating in the Smart Documents system according to the invention. Then this transaction will be passed to the concerned service company, so that full matching and verification will be made.

Step 9: The result will be transmitted to the reader system, so the beneficiary will be able to make sure whether the Smart Documents is correct or not, and to refuse the transaction if the Smart Documents not correct.

Step 10: In case of correctness of the Smart Documents, the reader system will issue a message to the beneficiary of the completion of the operation and transaction.

Further details of these applications are given in WO 01/41082 and PCT/IB02/02830.

The invention is subject to many variations from the examples described and shown in the drawings. As illustrated, normally the Smart Document is made of a single sheet of pliable paper, having magnetized strips or storage chips merged in one or more thick inclinable card portions. However, the thin portion forming the main document part of the Smart Document can consist of a folded over sheet, forming on the rear or front of the Smart Document a pocket that can be used to collate related papers, by the user or by the company. Such folded pocket can conveniently be arranged so it does not overlap with the thick card portion when flat. The folded pocket can however occupy all or part of the thin portion of the document. Such a pocket can be advantageous, e.g., for airline boarding passes where the pocket is on the back of the part retained by the airlines. A pocket can also be provided on the user's portion of the Boarding Pass or other Smart Document.

What is claimed is:

1. A smart document comprising a pliable thin portion carrying on the thin portion's front and/or rear face imprinted visible data, and a thick portion wherein a magnetic ship and/or storage chip (contact or contactless) is merged, the magnetic strip and/or storage chip storing encoded data that is readable by means of a reader,
characterized in that the thick portion that includes the magnetic strip and/or storage chip (contact or contactless) is a planar thick card portion attached to an edge of the thin portion in a manner allowing inclination of the thick card portion relative to the thin portion, the thick card portion being divided into first and second parts on either side of the attachment to the edge of the thin portion, the thick card portion being inclinable between:
a flat position, in which the first part of the thick card portion overlays an adjacent section or the thin portion, and in which the second part of the thick card portion protrudes beyond the attached edge of the thin portions, and
inclined positions in which the thick card portion is at a variable angle to the pliable thin portion, and in which the first and second parts of the thick card portion protrude in opposite directions from the attached edge of the thin portion at a variable angle to the adjacent section of the thin portion, wherein the thick card portion and the pliable thin portion remain connected by said attachment edge during and after inclination of the thick card portion relative to the pliable thin portion, allowing the thick card portion and the pliable thin portion to remain as a unitary smart document with a selectively inclinable thick card portion whose first and second parts on either side or the attachment edge remain accessible.

2. The smart document of claim 1, wherein the thin portion of the document and the smart document's attached thick card portion are both oblong with the long dimension or the thick card portion substantially equal to the short dimension of the thin portion, and the thick card portion is attached along the thick card portion's long direction to a narrow edge of the thin portion.

3. The smart document of claim 1, wherein the thick card portion is rectangular with rounded edges.

4. The smart document of claim 1, wherein the first part of the thick card portion is smaller than the second part.

5. The smart document of claim 1, wherein the first part of the thick card portion is larger than the second part.

6. The smart document of claim 1, wherein the thick card portion comprises an extension or tab on one of the smart document's edges that protrudes from the smart document's first or second part.

7. The smart document of claim 6, wherein the extension or tab of the thick card portion extends From the smart document's first part and overlays an adjacent section of the thin portion of the document in the flat position.

8. The smart document of claim 6, wherein the extension or tab of the thick card portion extends from the smart document's second part and protrudes beyond and in extension of the thin portion of the document in the flat position.

9. The smart document of claim 1, wherein the pliable thin portion is made of paper.

10. The smart document of claim 1, wherein the thick card portion is made of plastic, or a layered composite material such as paper/plastic.

11. The smart document of claim 1, wherein the pliable thin portion is generally rectangular.

12. The smart document of claim 11, which is a boarding pass of a transport system.

13. The smart document of claim 1, wherein the pliable thin portion comprises a perforated section remote from the edge to which the thick card portion is attached.

14. The smart document of claim 1, wherein the thick card portion is attached to the thin portion by glueing, lamination and/or bonding.

15. The smart document of claim 14, wherein the thin portion is extended by an integral thin layer which is merged with, laminated into or bonded to one face of the second part of the thick card portion.

16. The smart document of claim 1, wherein the thickness of the attached thick card portion corresponds to that required according to the specifications of standard reader devices for standard credit cards.

17. The smart document of claim 1, wherein a magnetized strip is merged on the front or rear face of the thick card portion adjacent a long edge thereof.

18. The smart document of claim 1, wherein a storage chip (contact or contactless) is merged on the front or rear face of the thick card portion and located centrally or slightly off-centre thereon.

19. The smart document of claim 1, wherein a magnetized strip or storage chip (contact or contactless) is merged in one of the first and second parts of the thick card portion, and the other of the first and second parts of the thick card portion is accessible to be gripped for passing the magnetized strip and/or storage chip (contact or contactless) through a reader when the thick card portion is inclined to the thin portion.

20. The smart document of claim 1, wherein the magnetic strip and/or storage chip (contact or contactless) contains an image of at least one identification means.

21. The smart document of claim 1, wherein the encoded data stored in the magnetized strip and/or storage chip (contact or contactless) comprises a signature.

22. The smart document of claim 1, comprising a plurality of said planar thick card portions inclinably attached to different parts of the thin portion, each thick card portion including a magnetic strip and/or storage chip (contact or contactless).

23. The smart document of claim 22, comprising two planar thick card portions inclinably mounted at opposite ends of the thin portion.

24. The smart document of claim 1, whose pliable thin portion comprises a folded pocket.

25. The smart document of claim 1, which is a bank cheque.

26. The smart document of claim 1, which is an access pass.

27. The smart document of claim 1, which is a multi-purpose document for performing multiple security, identification, access and/or financial functions by means of the data encoded in the magnetic strip and/or storage chip (contact or contactless) and the imprinted visible data on the thin portion.

28. A process For producing smart documents as claimed in claim 1 which comprises printing visible data on the front and/or back of the thin portion and encoding data in the thick card portion's magnetic strip and/or storage strip (contact or contactless) before and/or after the thick card portion is attached to the thin portion, at least part of the encoded data corresponding to the printed visible data.

29. A method of using a smart document according to claim 1, wherein the thick card portion of the document is passed through a reader while the thick card portion is attached to the entire thin portion.

30. A method of using a smart document according to claim 1 to, wherein the thick card portion of the document is passed through a reader after a part of the thin portion has been detached.

31. A method of authenticating financial transactions, comprising the step of using the smart document according to claim 1, said authenticating comprising processing the data encoded in the magnetic strip and/or storage chip.

32. A method of controlling access to restricted or private areas, comprising the step of using the smart document according to claim 1, said controlling comprising processing the data encoded in the magnetic strip and/or storage chip 1.

33. A method of processing information relating to boarding passengers into means for transportation, comprising the step of using the smart document according to claim 1, said method of comprising processing the data encoded in the magnetic strip arid/or storage chip and the imprinted visible data on the thin portion.

34. A method of tracking and/or retrieving passengers baggage, comprising the step of using the smart document according to claim 1, said method comprising processing the data encoded in the magnetic strip and/or storage chip.

35. A method of performing multiple security, identification, access and/or financial functions, comprising the step of using the smart document according to claim 1, said method comprising processing the data encoded in the magnetic strip and/or storage chip and the imprinted visible data on the thin portion.

* * * * *